United States Patent
Depalma et al.

(10) Patent No.: US 11,156,109 B2
(45) Date of Patent: Oct. 26, 2021

(54) BLADE RETENTION FEATURES FOR TURBOMACHINES

(71) Applicant: GE Avio S.r.l., Rivalta di Torino (IT)

(72) Inventors: Andrea Depalma, Rivalta di Torino (IT); Antonio Giuseppe D'Ettole, Rivoli (IT); Matteo Renato Usseglio, Turin (IT)

(73) Assignee: GE AVIO S.r.l, Rivalta di Torino (IT)

( * ) Notice: Subject to any disclaimer, the term of this patent is extended or adjusted under 35 U.S.C. 154(b) by 0 days.

(21) Appl. No.: 16/987,747

(22) Filed: Aug. 7, 2020

(65) Prior Publication Data
US 2021/0108522 A1 Apr. 15, 2021

(30) Foreign Application Priority Data
Aug. 13, 2019 (IT) .......................... 102019000014724

(51) Int. Cl.
*F01D 5/30* (2006.01)
*F01D 5/02* (2006.01)

(52) U.S. Cl.
CPC ............ *F01D 5/3007* (2013.01); *F01D 5/02* (2013.01); *F05D 2220/32* (2013.01); *F05D 2230/60* (2013.01); *F05D 2240/24* (2013.01)

(58) Field of Classification Search
CPC ...... F01D 5/3007; F01D 5/02; F05D 2220/32; F05D 2230/60; F05D 2240/24
See application file for complete search history.

(56) References Cited

U.S. PATENT DOCUMENTS

| | | | |
|---|---|---|---|
| 3,339,833 A | 9/1967 | Bill et al. | |
| 4,451,205 A | 5/1984 | Honda et al. | |
| 4,502,841 A * | 3/1985 | Kebedjis | F01D 5/326 416/220 R |
| 4,623,298 A | 11/1986 | Hallinger et al. | |
| 4,730,983 A | 3/1988 | Naudet et al. | |
| 4,986,737 A | 1/1991 | Erdmann | |
| 5,007,800 A * | 4/1991 | Hacault | F01D 9/042 416/220 R |
| 5,018,941 A * | 5/1991 | Heurtel | F01D 5/32 416/220 R |
| 5,131,814 A * | 7/1992 | Przytulski | F01D 5/3007 416/217 |
| 5,197,281 A | 3/1993 | Przytulski et al. | |
| 5,257,909 A | 11/1993 | Glynn et al. | |
| 5,288,210 A | 2/1994 | Albrecht et al. | |
| 5,307,622 A | 5/1994 | Ciokajlo et al. | |
| 6,139,263 A | 10/2000 | Klingels | |
| 6,732,502 B2 | 5/2004 | Seda et al. | |
| 7,186,073 B2 | 3/2007 | Orlando et al. | |
| 7,334,392 B2 | 2/2008 | Moniz et al. | |
| 7,451,592 B2 | 11/2008 | Taylor et al. | |

(Continued)

*Primary Examiner* — Michael Lebentritt
(74) *Attorney, Agent, or Firm* — McGarry Bair PC

(57) ABSTRACT

A turbomachine includes a rotatable annular outer drum rotor connected to a first plurality of blades. Each of the first plurality of blades includes a blade root portion secured to the rotatable annular outer drum rotor. Each of the blade root portions includes one or more structural radial retention features for radially retaining each of the blade root portions within the rotatable annular outer drum and one or more axial retention features for axially retaining each of the blade root portions within the rotatable annular outer drum.

20 Claims, 17 Drawing Sheets

(56) References Cited

U.S. PATENT DOCUMENTS

| | | | |
|---|---|---|---|
| 7,494,323 B2 | 2/2009 | Douchkin et al. | |
| 7,513,102 B2 | 4/2009 | Moniz et al. | |
| 8,015,798 B2 | 9/2011 | Norris et al. | |
| 8,454,303 B2 | 6/2013 | Garcia-Crespo | |
| 8,777,563 B2 | 7/2014 | Sarawate et al. | |
| 8,784,064 B2 | 7/2014 | Aschenbruck et al. | |
| 8,869,504 B1 | 10/2014 | Schwarz et al. | |
| 8,935,913 B2 | 1/2015 | Kupratis et al. | |
| 9,051,849 B2 * | 6/2015 | Ring | F01D 9/042 |
| 9,194,244 B2 * | 11/2015 | Willett, Jr. | F01D 11/001 |
| 9,404,387 B2 | 8/2016 | Mitaritonna et al. | |
| 9,506,367 B2 | 11/2016 | Clouse | |
| 9,726,033 B2 * | 8/2017 | Gendraud | F01D 5/3015 |
| 9,739,205 B2 | 8/2017 | Schwarz et al. | |
| 9,822,659 B2 | 11/2017 | Arikawa et al. | |
| 9,840,928 B2 | 12/2017 | Brummitt-Brown et al. | |
| 10,301,951 B2 * | 5/2019 | Bergman | F02C 3/04 |
| 2005/0042085 A1 * | 2/2005 | Richards | F01D 9/042 |
| | | | 415/209.3 |
| 2009/0041610 A1 | 2/2009 | Meier | |
| 2016/0251973 A1 * | 9/2016 | Evans | F01D 5/323 |
| | | | 416/221 |
| 2016/0327065 A1 * | 11/2016 | Boewing | F04D 29/321 |
| 2017/0096903 A1 * | 4/2017 | Schiessl | F01D 5/081 |
| 2017/0211590 A1 | 7/2017 | Moniz et al. | |
| 2018/0223732 A1 | 8/2018 | Clements et al. | |
| 2020/0102842 A1 * | 4/2020 | Sippel | F01D 5/284 |
| 2021/0047930 A1 * | 2/2021 | Depalma | F01D 5/3007 |
| 2021/0047933 A1 * | 2/2021 | Usseglio | F01D 11/127 |

* cited by examiner

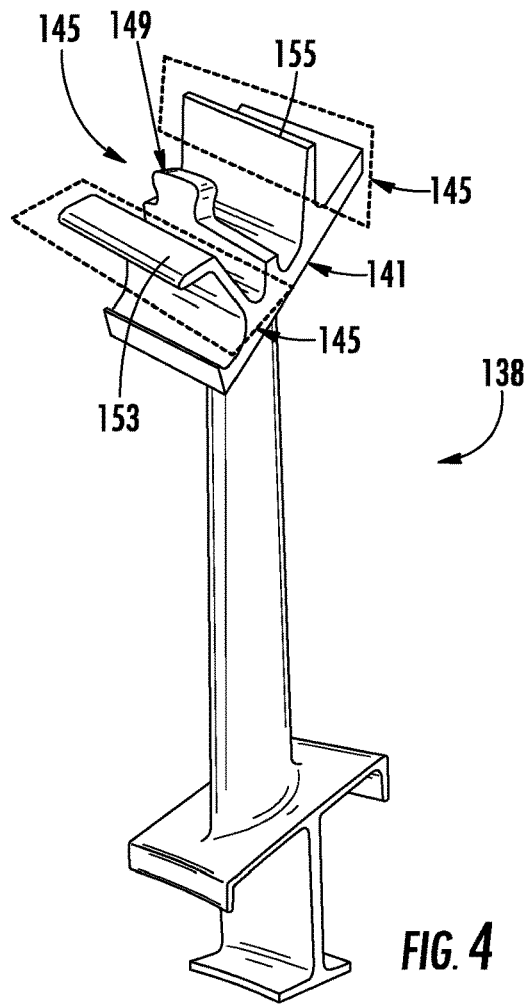
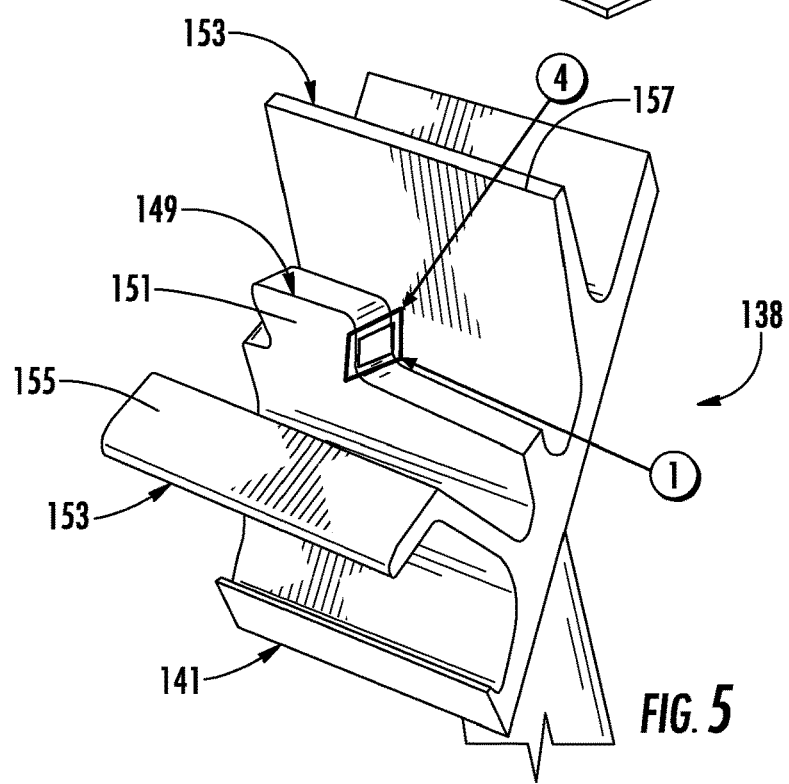

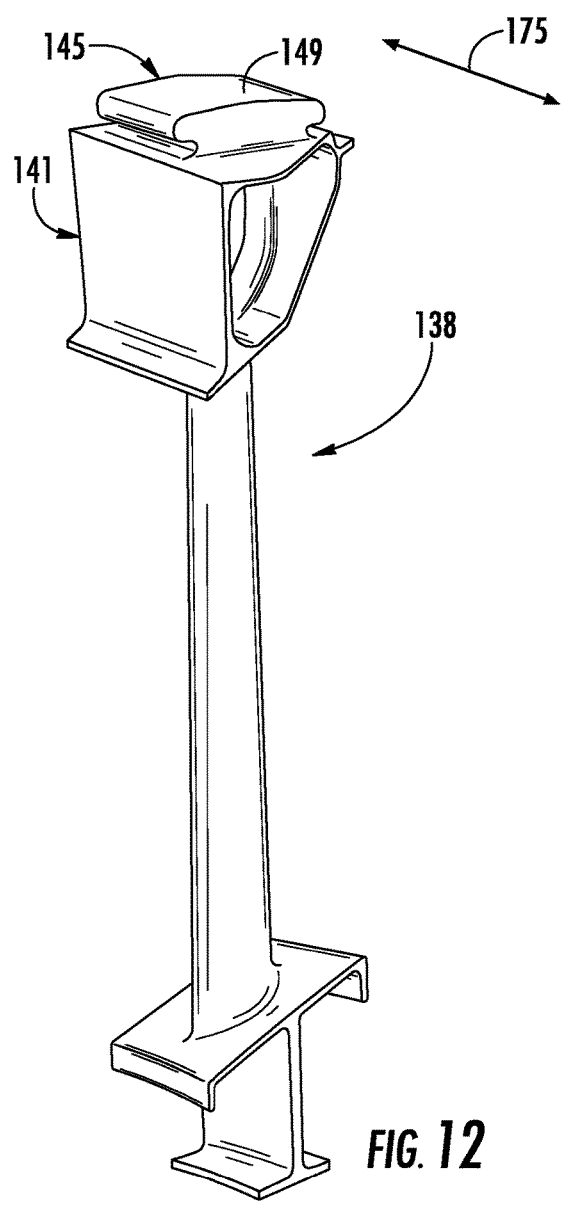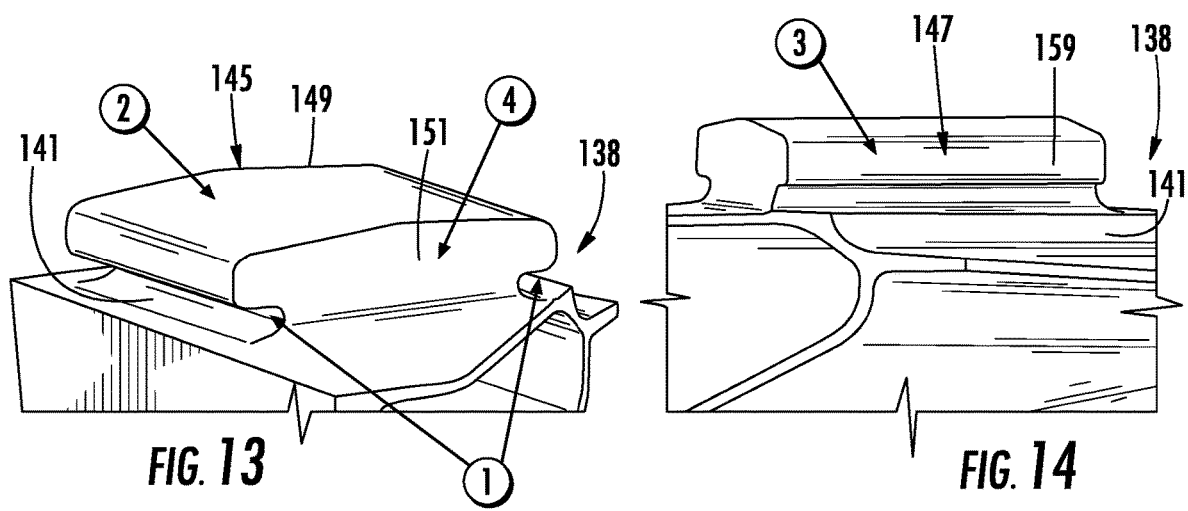
FIG. 12
FIG. 13
FIG. 14

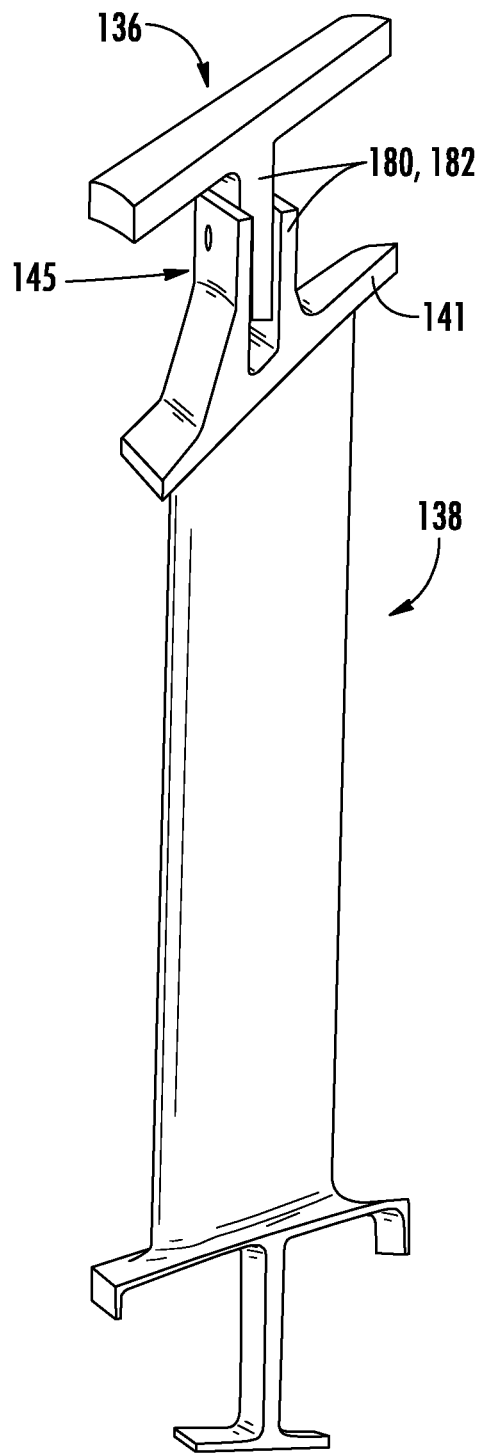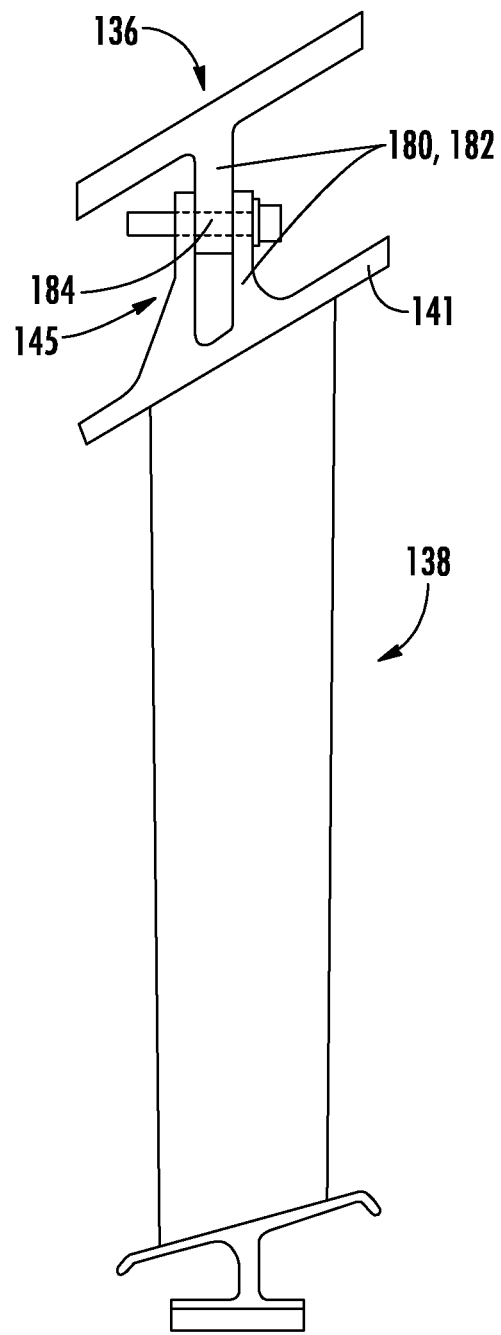
FIG. 24
FIG. 25

BLADE RETENTION FEATURES FOR TURBOMACHINES

GOVERNMENT SPONSORED RESEARCH

The project leading to this application has received funding from the Clean Sky 2 Joint Undertaking under the European Union's Horizon 2020 research and innovation program under grant agreement No. CS2-FRC-GAM 2018/2019-807090.

FIELD

The present disclosure relates generally to turbomachines, and more particularly, to blade retention features for turbomachines, such as gas turbine engines.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Gas turbine engines generally include a plurality of rotating rotor blades in at least one of a compressor of the compressor section or a turbine of the turbine section. Moreover, at least certain gas turbine engines also include a plurality of counter-rotating rotor blades in at least one of the compressor of the compressor section or the turbine of the turbine section. Common rotating blades are assembled and retained internally by a disk, e.g. by means of the blade root, dovetail or fir tree shaped or with a third part as a rivet or a bolted joint. The disk is typically located internally respect to the blade row. Counter-rotating blades are similarly attached to a rotating part, but externally.

Notwithstanding the aforementioned, there is a continuing need for improved retention features for retaining such blades of turbomachines within their respective rotating part.

BRIEF DESCRIPTION

Aspects and advantages of the invention will be set forth in part in the following description, or may be obvious from the description, or may be learned through practice of the invention.

In one aspect, the present disclosure is directed to a turbomachine. The turbomachine includes a rotatable annular outer drum rotor connected to a first plurality of blades. Each of the first plurality of blades includes a blade root portion secured to the rotatable annular outer drum rotor. Each of the blade root portions includes one or more structural radial retention features for radially retaining each of the blade root portions within the rotatable annular outer drum and one or more axial retention features for axially retaining each of the blade root portions within the rotatable annular outer drum.

In another aspect, the present disclosure is directed to a method of assembling a plurality of blades of a turbomachine within a rotatable annular outer drum rotor. The method includes arranging a plurality of blade root portions of the plurality of blades within a slot of the rotatable annular outer drum rotor. The method also includes rotating the plurality of blade root portions of the plurality of blades within the slot of the rotatable annular outer drum rotor. Further, the method includes inserting a plurality of spacers into the slot of the rotatable annular outer drum rotor between one or more of the plurality of blade root portions of the plurality of blades so as to secure the plurality of blades within the rotatable annular outer drum rotor and to minimize gaps between the plurality of blades. It should be appreciated that the method may further include any of the additional steps and/or features as described herein.

In yet another aspect, the present disclosure is directed to a turbomachine. The turbomachine includes a rotatable annular outer drum rotor connected to a plurality of blades. Each of the plurality of blades includes a blade root portion secured to the rotatable annular outer drum rotor. The blade root portions are secured to the rotatable annular outer drum rotor via a plurality of corresponding male and female interlocking elements and one or more fasteners arranged through the corresponding male and female interlocking elements. It should be appreciated that the turbomachine may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 illustrates a perspective view of one embodiment of one of the first plurality of low pressure turbine blades according to the present disclosure;

FIG. 5 illustrates a detailed, perspective view of the blade root portion of the low pressure turbine blade illustrated in FIG. 4;

FIG. 12 illustrates a perspective view of yet another embodiment of one of the first plurality of low pressure turbine blades according to the present disclosure;

FIG. 13 illustrates a detailed, perspective view of the blade root portion of the low pressure turbine blade illustrated in FIG. 12;

FIG. 14 illustrates another detailed, perspective view of the blade root portion of the low pressure turbine blade illustrated in FIG. 12;

FIG. 24 illustrates a perspective view of still another embodiment of one of the first plurality of low pressure turbine blades according to the present disclosure;

FIG. 25 illustrates a cross-sectional view of the low pressure turbine blade illustrated in FIG. 24 connected to the annular outer drum rotor.

Figure 1:
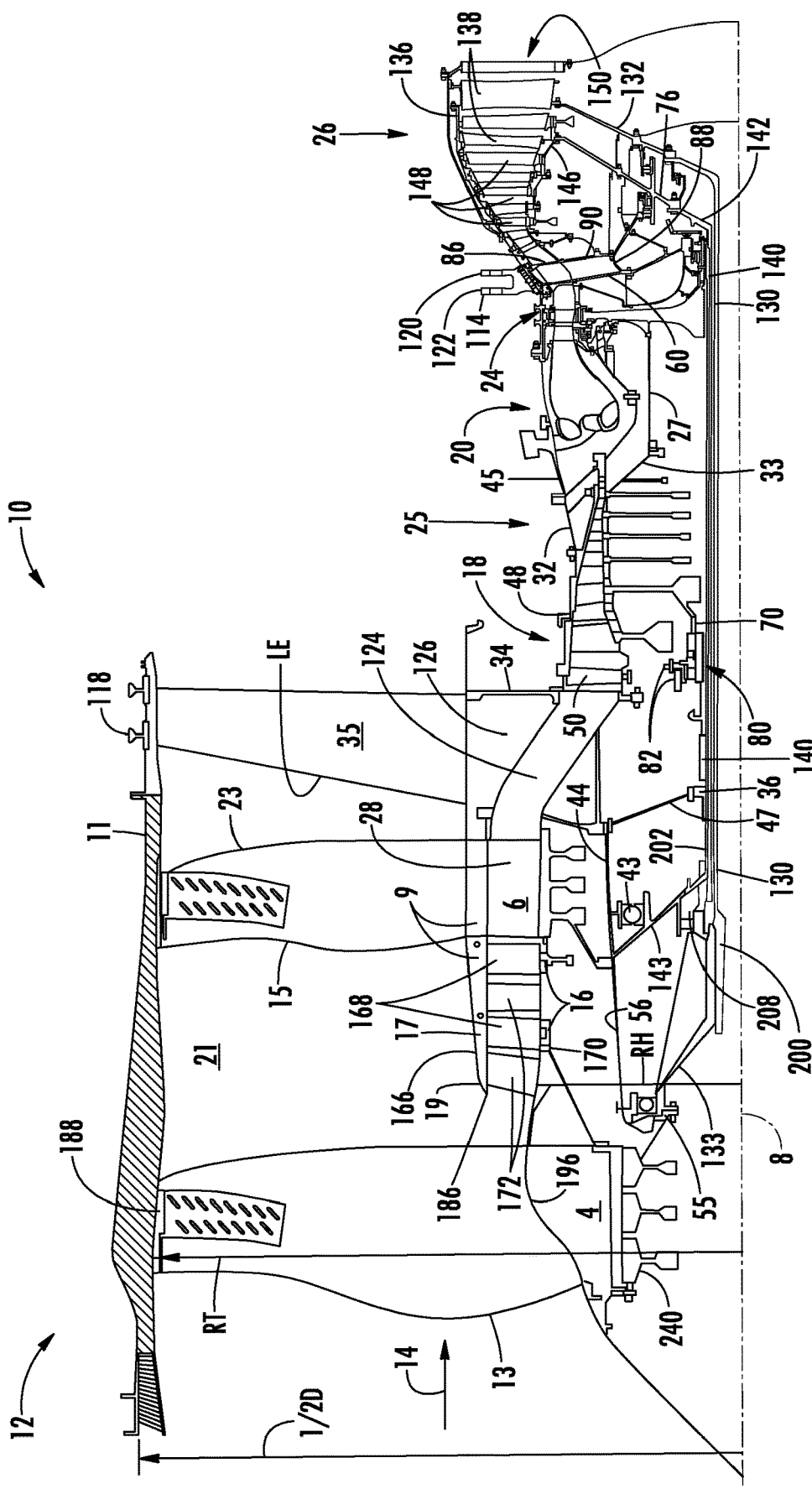
FIG. 1 illustrates a longitudinal sectional view of one embodiment of an aircraft turbofan gas turbine engine with a counter rotating low pressure turbine supported by an inter-turbine frame axially located between the low pressure turbine and a high pressure turbine.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component or feature from another and are not intended to signify location, importance, or magnitude of the individual components or features.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. The terms "coupled," "fixed," "attached to," and the like refer to direct coupling, fixing, or attaching, as well as indirect coupling, fixing, or attaching through one or more intermediate components or features, unless otherwise specified herein. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic view of one embodiment of a turbomachine, such as a turbofan gas turbine engine 10 according to the present disclosure. As shown, the gas turbine engine 10 is circumscribed about an engine centerline 8 and includes a fan section 12 which receives inlet airflow of ambient air 14. The fan section 12 has counter rotating first and second fans 4 and 6 including first and second fan blade rows 13 and 15 and counter rotating first and second boosters 16 and 17, respectively. The counter rotating first and second boosters 16 and 17 are axially located between the counter rotating first and second fan blade rows 13 and 15, an arrangement which provides reduced noise emanating from the fan section 12. Following the fan section 12 is a high pressure compressor (HPC) 18, a combustor 20 which mixes fuel with the air 14 pressurized by the HPC 18 for generating combustion gases which flow downstream through a high pressure turbine (HPT) 24, and a counter rotating low pressure turbine (LPT) 26 from which the combustion gases are discharged from the engine 10. The engine 10 is designed such that the last stage of the second booster 17 and, in the exemplary embodiment, the second fan blade row 15 are counter rotatable with respect to the high pressure compressor 18. This reduces the sensitivity of the engine 10 to airflow inlet distortion of the fan section 12. It also reduces mutual sensitivity to rotating stall cells in the other rotors.

A high pressure shaft 27 joins the HPT 24 to the HPC 18 to substantially form a first or high pressure rotor 33. The high pressure compressor 18, the combustor 20, and the high pressure turbine 24 collectively are referred to as a core engine 25 which includes, for the purposes of this patent, the high pressure shaft 27. The core engine 25 is modular such that as a single unit it can be independently replaced separate from the other parts of the gas turbine.

A bypass duct 21 radially, bounded by a fan casing 11 and a rotatable annular radially inner bypass duct wall 9, surrounds the counter rotating first and second boosters 16 and 17 and an inlet duct 19 to the high pressure compressor 18 of the core engine 25. The bypass duct 21 is radially bounded by a fan casing 11 and an annular radially inner bypass duct wall 9. The radially inner bypass duct wall 9 includes a rotatable wall section 22 fixedly mounted to the second fan blade row 15 and from which the second booster 17 depends radially inwardly. A radially outer portion 23 of the second fan blade row is radially disposed within the bypass duct 21.

Figure 2:
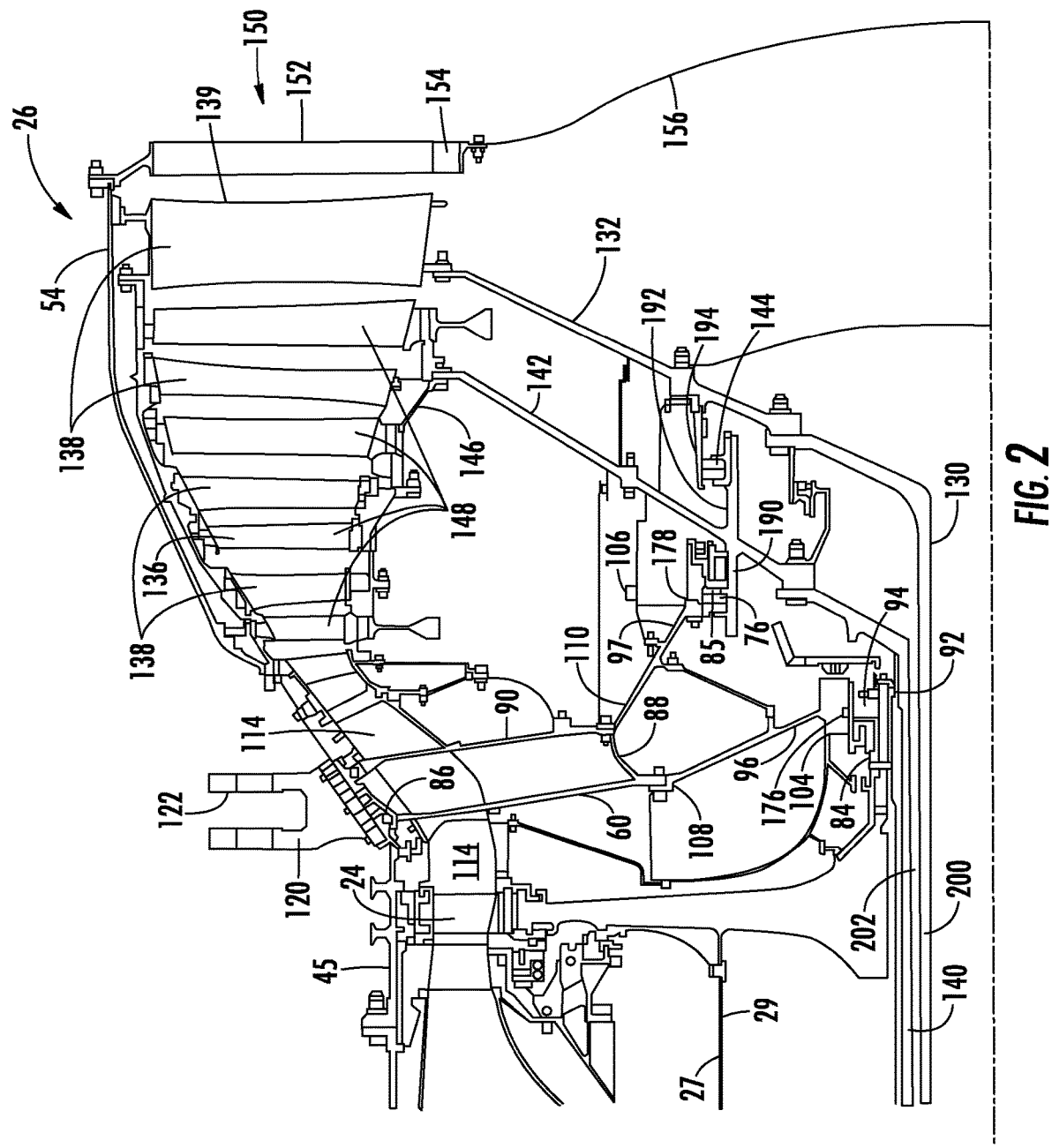
FIG. 2 illustrates an enlarged view illustration of the inter-turbine frame and counter rotating low pressure turbine rotors of the engine in FIG. 1.

Referring to FIGS. 1 and 2, the counter rotating low pressure turbine 26 includes an annular outer drum rotor 136 rotatably mounted to a low pressure inner shaft 130 by an aft low pressure inner conical shaft extension 132. The outer drum rotor 136 includes a plurality of low pressure turbine blade rows 138 extending radially inwardly therefrom and axially spaced from each other. The drum rotor 136 is cantilevered off of a final stage 139 of the low pressure turbine blade rows 138 which is bolted to the aft low pressure inner conical shaft extension 132. The counter rotating low pressure turbine 26 also includes an annular low pressure inner drum rotor 146 rotatably mounted to a low pressure outer shaft 140 by an aft low pressure outer conical shaft extension 142. The inner drum rotor 146 includes a plurality of second low pressure turbine blade rows 148 extending radially outwardly therefrom and axially spaced from each other. The first low pressure turbine blade rows 138 are interdigitated with the second low pressure turbine blade rows 148.

The low pressure outer shaft 140 drivingly connects the inner drum rotor 146 to the second fan blade row 15 and the second booster 17. The second fan blade row 15 is connected to the low pressure outer shaft 140 by a forward conical outer shaft extension 143. The low pressure outer shaft 140, the inner drum rotor 146, the second fan blade row 15, and the second booster 17 are major components of a low pressure outer rotor 202. The low pressure inner shaft 130 drivingly connects the outer drum rotor 136 to the first fan blade row 13 and the first booster 16. The first fan blade row 13 is connected to the low pressure inner shaft 130 by a forward conical inner shaft extension 133. The low pressure inner shaft 130, the outer drum rotor 136, the first fan blade row 13, and the first booster 16 are major components of a low pressure inner rotor 200.

The first booster 16 includes an annular first booster rotor section 166 including the rotatable wall section 22 from which axially spaced apart first booster blade rows 168 extend radially inwardly. The annular first booster rotor section 166 is illustrated as being integrally bladed in a manner similar to an integrally bladed disk, commonly referred to as a Blisk, or an integrally bladed rotor which has been used in conventional rotors because they are lightweight and allow no blade attachment leakage. The operating low speeds of the boosters and the low weight integrally bladed disk design of the first booster rotor section 166 helps minimize stresses and deflections of the first booster rotor section 166.

The second booster 17 includes an annular second booster rotor section 170 from which axially spaced apart second booster blade rows 172 extend radially outwardly. A radially inner portion 28 of the second fan blade row 15 is radially disposed within the inlet duct 19 and rotates with the second booster 17 and therefore is considered part of the second booster 17 and a second booster blade row 172. The first and second booster blade rows 168 and 172 are interdigitated and are counter rotating. The first and second fan blade rows 13 and 15 are fixedly attached to the first and second booster rotor sections 166 and 170, respectively. The low pressure inner and outer shafts 130 and 140, respectively, are at least, in part, rotatably disposed co-axially with and radially inwardly of the high pressure rotor 33.

The gas turbine engine 10 also has frame structure 32 including a forward or fan frame 34 connected by an engine casing 45 to a mid-engine or inter-turbine frame 60. The second fan blade row is axially located close to struts 35 of the fan frame 34 and so the leading edges of struts 35 are swept or leaned axially aftwardly to reduce noise. The engine 10 is mounted within or to an aircraft such as by a pylon (not illustrated) which extends downwardly from an aircraft wing. The inter-turbine frame 60 includes a first structural ring 86, which may be a casing, disposed co-axially about the centerline 8. The inter-turbine frame 60 further includes a second structural ring 88 disposed co-axially with and radially spaced inwardly of the first structural ring 86 about the centerline 8. The second structural ring 88 may also be referred to as a hub. A plurality of circumferentially spaced apart struts 90 extend radially between the first and second rings 86 and 88 and are fixedly joined thereto. The struts 90 are hollow in the exemplary embodiment of the invention illustrated herein but, in other embodiments, the struts may not be hollow. Because the inter-turbine frame 60 is axially located between the HPT 24 and the LPT 26 of the high pressure rotor 33 and the low pressure inner and outer rotors 200 and 202, it is referred to as an inter-turbine frame also sometimes referred to as a mid-engine frame. An inter-turbine transition duct 114 between the HPT 24 and the LPT 26 passes through the inter-turbine frame 60.

The engine is mounted to the aircraft at a forwardly located fan frame forward mount 118 on the fan frame 34 and at an aftwardly located turbine frame aft mount 120 on the inter-turbine frame 60. The engine 10 may be mounted below an aircraft wing by a pylon at the forward mount 118 and the aft mount 120 spaced axially downstream from the forward mount 118. The aft mount 120 is used to fixedly join the inter-turbine frame 60 to a platform which is fixedly joined to the pylon. In one embodiment, the aft mount 120 includes a U-shaped clevis 122. Conventional mounts often use a set of circumferentially spaced apart U-shaped clevises 122 (only one of the U-shaped clevises is shown in the cross-sectional illustrations in the figures) on the inter-turbine frame 60. The U-shaped clevises 122 are designed to be connected by a set of pins to a set of links. The links are connected to a platform on the bottom of the pylon. The U-shaped clevises 122 are one type of frame connecting means for connecting the engine to an aircraft. Other types of mounting means besides clevises are known in the aircraft industry and can be utilized to mount the frame of the present invention and the engine to the aircraft.

Figure 3:
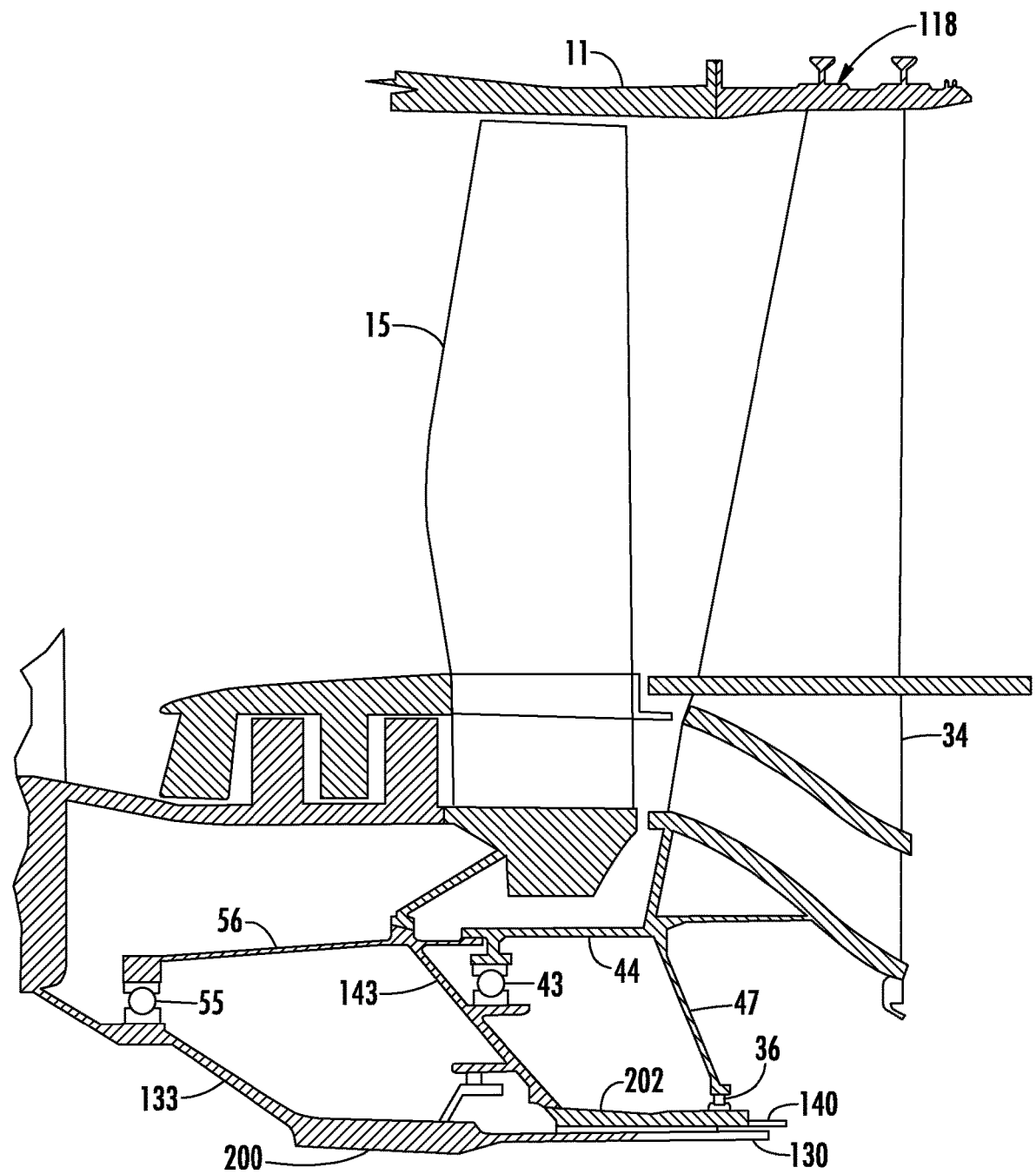
FIG. 3 illustrates an enlarged view illustration of a fan frame and forward bearings and sump of the engine in FIG. 1.

Referring more particularly to FIG. 3, the low pressure outer rotor 202, by way of the forward conical outer shaft extension 143, is rotatably supported axially and radially from the fan frame 34 by an aft thrust bearing 43 mounted in a first bearing support structure 44 and a second bearing 36, a roller bearing, mounted in a second bearing support structure 47. The low pressure inner rotor 200, by way of the forward conical inner shaft extension 133, is rotatably supported axially and radially from the fan frame 34 by a forward differential thrust bearing 55 which is mounted between a forwardly extending extension 56 of the forward conical outer shaft extension 143 and the forward conical inner shaft extension 133. The low pressure inner rotor 200 is further rotatably supported radially from the fan frame 34 by a forward differential bearing 208, a roller bearing, between the low pressure inner shaft 130 and the low pressure outer shaft 140. The first and second bearing support structures 44 and 47 are fixedly attached to the fan frame 34.

Referring more particularly to FIG. 2, the low pressure outer rotor 202, by way of the aft low pressure outer conical shaft extension 142 connected to the low pressure outer shaft 140, is rotatably supported radially by a third bearing 76 within the inter-turbine frame 60. The third bearing 76 is disposed between an aft bearing support structure 97 attached to an aft portion 110 of the inter-turbine frame 60 and a forward inner extension 190 of the aft low pressure outer conical shaft extension 142. The low pressure outer rotor 202 is most aftwardly rotatably supported by the third bearing 76 which is thus referred to as an aftwardmost low pressure rotor support bearing. The inter-turbine frame 60 of the present invention is axially located between the HPT 24 and the LPT 26 and thus substantially supports the entire low pressure turbine 26.

The low pressure inner rotor 200, by way of the aft low pressure inner conical shaft extension 132 connected to the low pressure inner shaft 130, is rotatably supported radially by the aft low pressure outer conical shaft extension 142 of the low pressure outer rotor 202. A differential bearing 144 (also referred to as an inter-shaft bearing) is disposed between an aft inner extension 192 of the aft low pressure outer conical shaft extension 142 and an outer extension 194 of the aft low pressure inner conical shaft extension 132. This allows the low pressure inner and outer rotors 200 and 202 to counter rotate.

Referring back to FIG. 1, a forward high pressure end 70 of the high pressure compressor 18 of the high pressure rotor 33 is radially rotatably supported by a bearing assembly 80 mounted in a bearing assembly support structure 82 attached to the fan frame 34. Referring more particularly to FIG. 2, an aft end 92 of the high pressure rotor 33 is aftwardly radially rotatably supported by a fifth bearing 94 mounted in a forward bearing support structure 96 attached to a forward portion 108 of the inter-turbine frame 60. The forward and aft bearing support structures 96 and 97 which are fixedly joined or attached to the forward and aft portions 108 and 110, respectively, of the inter-turbine frame 60 and thus are spaced axially apart. The forward and aft portions 108 and 110, respectively, of the inter-turbine frame 60 are separated by the second structural ring 88.

Forward and aft sump members 104 and 106 are joined to the inter-turbine frame 60 and carried by forward and aft bearing support structures 96 and 97. The forward and aft sump members 104 and 106 support the fifth bearing 94 and the third bearing 76 in forward and aft cylindrical central bores 84 and 85, respectively, of the sump members. The fifth bearing 94 and the third bearing 76 have forward and aft fixed outer races 176 and 178 that are fixedly connected to the forward and aft bearing support structures 96 and 97, respectively.

Located aft of the LPT 26 is an outlet guide vane assembly 150 which supports a stationary row of outlet guide vanes 152 that extend radially inwardly between a low pressure turbine casing 54 and an annular box structure 154. The outlet guide vane assembly 150 deswirls gas flow exiting the LPT 26. The low pressure turbine casing 54 connected is bolted to the engine casing 45 at the end of the inter-turbine transition duct 114 between the HPT 24 and the LPT 26. A dome-shaped cover plate 156 is bolted to the annular box structure 154. The outlet guide vane assembly 150 is not referred to and does not function as a frame because it does not rotatably support any of the engine's rotors.

The high pressure compressor 18 of turbofan gas turbine engine 10 of the present invention is operable and designed to operate with a relatively high compressor pressure ratio in a range of about 15 to about 30 and an overall pressure ratio in a range of about 40 to about 65. The compressor pressure ratio is a measure in the rise of pressure across just the high pressure compressor 18. The overall pressure ratio is a measure in the rise of pressure across the fan all the way through the high pressure compressor 18, i.e., it is a ratio of pressure exiting the high pressure compressor divided by pressure of ambient air 14 entering the fan section 12. The high pressure compressor 18 is illustrated having six high pressure stages 48 and three variable vane stages 50 for the first four of the high pressure stages 48. Less than four variable vane stages 50 may be used. The high pressure compressor 18 has a relatively small number of the high pressure stages 48 and the invention contemplates using between 6 and 8 of the high pressure stages and about four of the variable vane stages 50 or less. This makes for a short engine while still having a high overall pressure ratio in a range of 40-65.

The engine has a design bypass ratio in a range of 5-15 and a design fan pressure ratio in a range of 1.4-2.5. The counter rotating first and second fan blade rows 13 and 15 are designed to operate with tip speeds that, for the two blade rows, sum to a range of about 1000 to 2500 feet/sec which allows the use of light weight composite fan blades. Light weight, uncooled, high temperature capability, counter rotating ceramic matrix composite (CMC) airfoils may be used in the counter rotating low pressure turbine 26. Thus, the engine 10 and the fan section 12 may be described as having a sum of operational fan tip speeds of the first and second fan blade rows 13 and 15 in a range of 1000 to 2500 feet per second.

Referring still to FIG. 1, a tip radius RT is illustrated, as measured from the engine centerline 8 to a fan blade tip 188 of the first fan blade row 13 and a hub radius RH as measured from the engine centerline 8 to a rotor hub 196 of the low pressure inner rotor 200 at an entrance 186 to the inlet duct 19 to the high pressure compressor 18 of the core engine 25. The engine 10 of the present invention may be designed with a small fan inlet hub to tip radius ratio (RH/RT) in a range between 0.20 and 0.35. For a given set of fan inlet and inlet duct annulus areas a low fan inlet hub to tip radius ratio allows a smaller fan diameter when compared to a larger ratio. However, fan inlet hub to tip radius ratio levels are constrained by the ability to design a disk to support the rotating fan blades. The fan blades in the exemplary embodiment illustrated herein are made of lightweight composite materials or aluminum and rotor fan tip speeds are designed so that a fan disk 126 can be designed for the fan inlet hub to tip radius ratio to be as low as 0.20. The low fan inlet hub to tip radius ratio allows low slopes and short lengths of the core engine transition duct 124 between the fan section 12 and the high pressure compressor 18 and of the inter-turbine transition duct 114 between the HPT 24 and the LPT 26.

Figure 7:
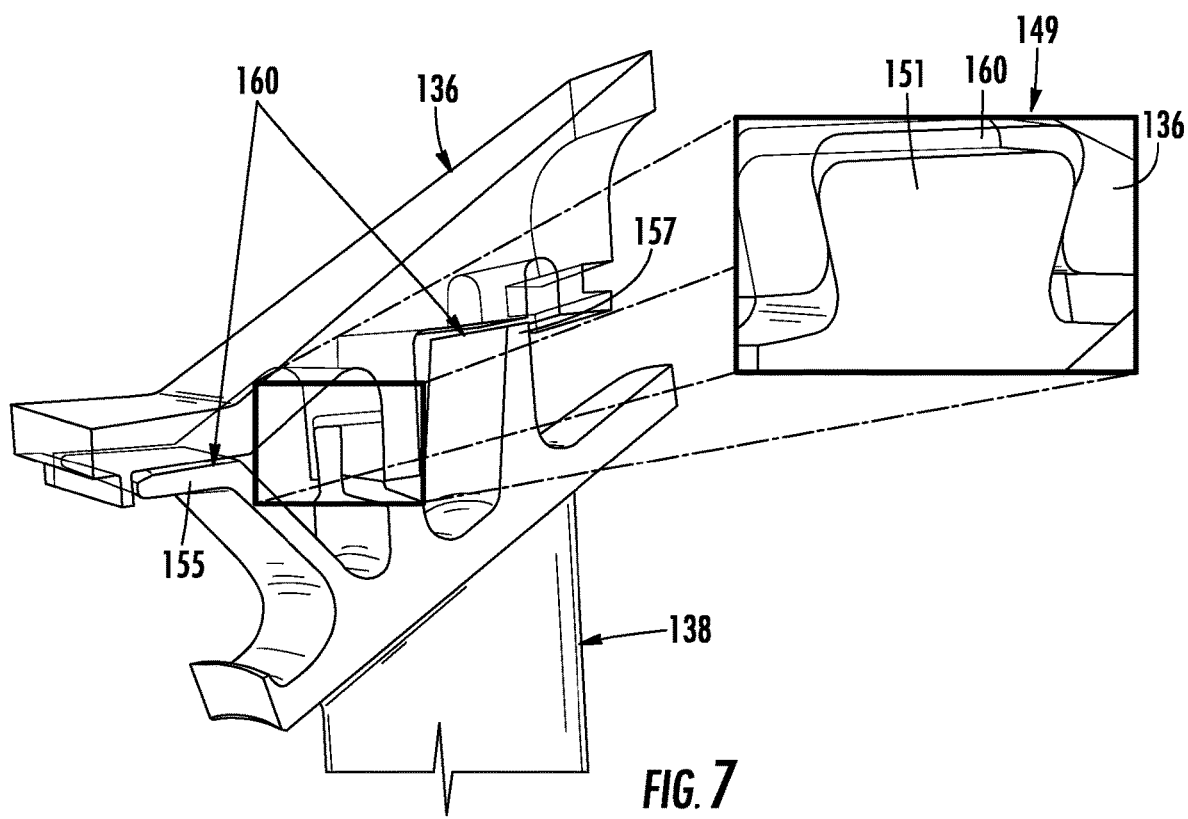
FIG. 7 illustrates a detailed, perspective view of the blade root portion of the low pressure turbine blade illustrated in FIG. 4 connected to the annular outer drum rotor.
Figure 8:
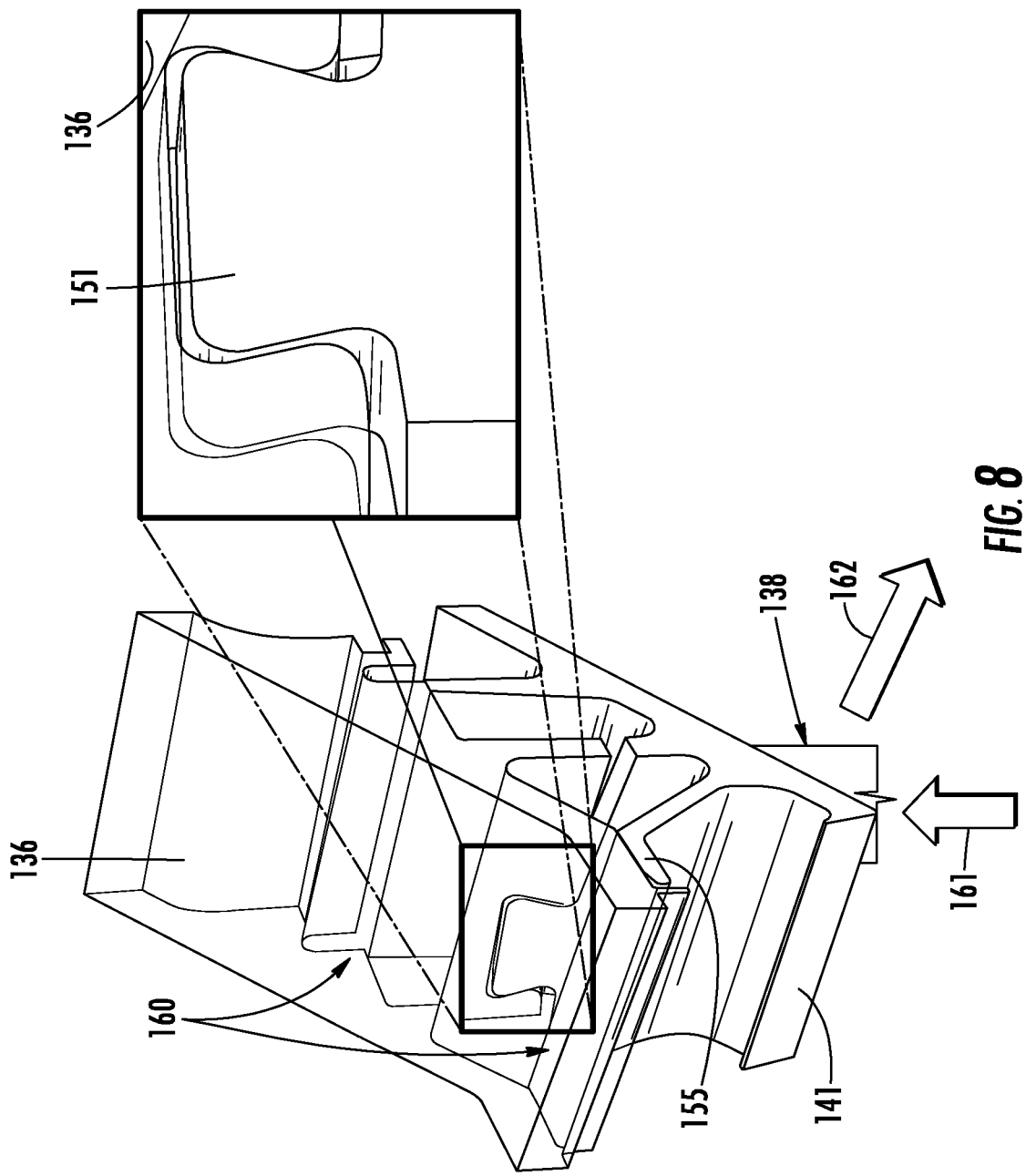
FIG. 8 illustrates another detailed, perspective view of the blade root portion of the low pressure turbine blade illustrated in FIG. 4 connected to the annular outer drum rotor.
Figure 9:
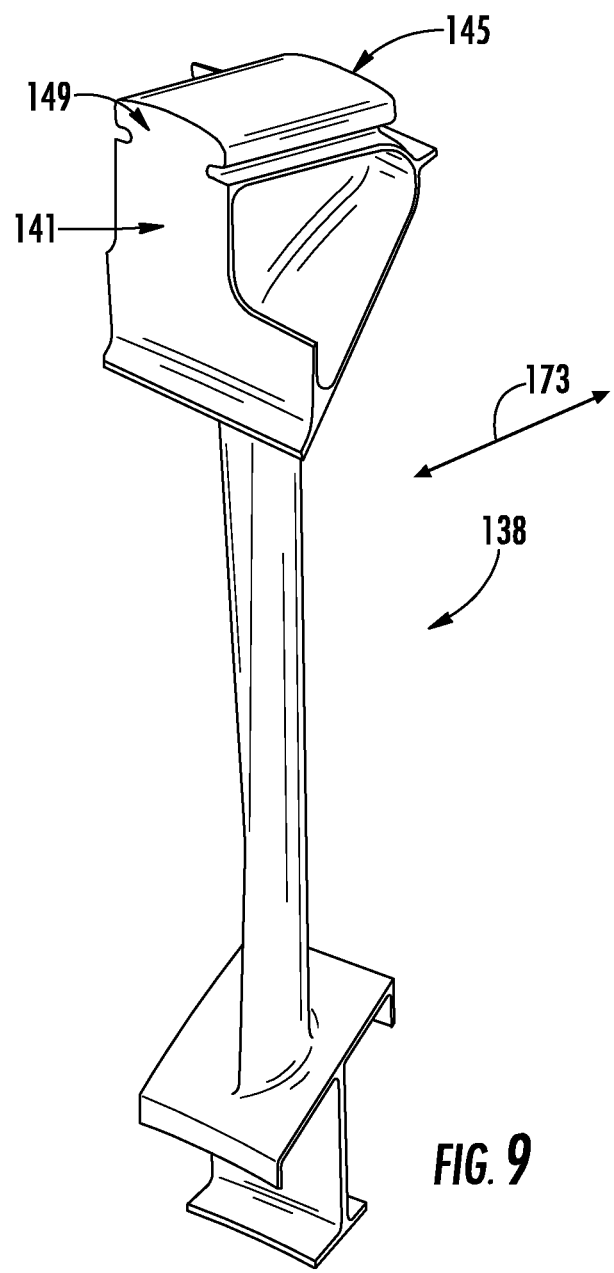
FIG. 9 illustrates a perspective view of another embodiment of one of the first plurality of low pressure turbine blades according to the present disclosure.
Figure 10:
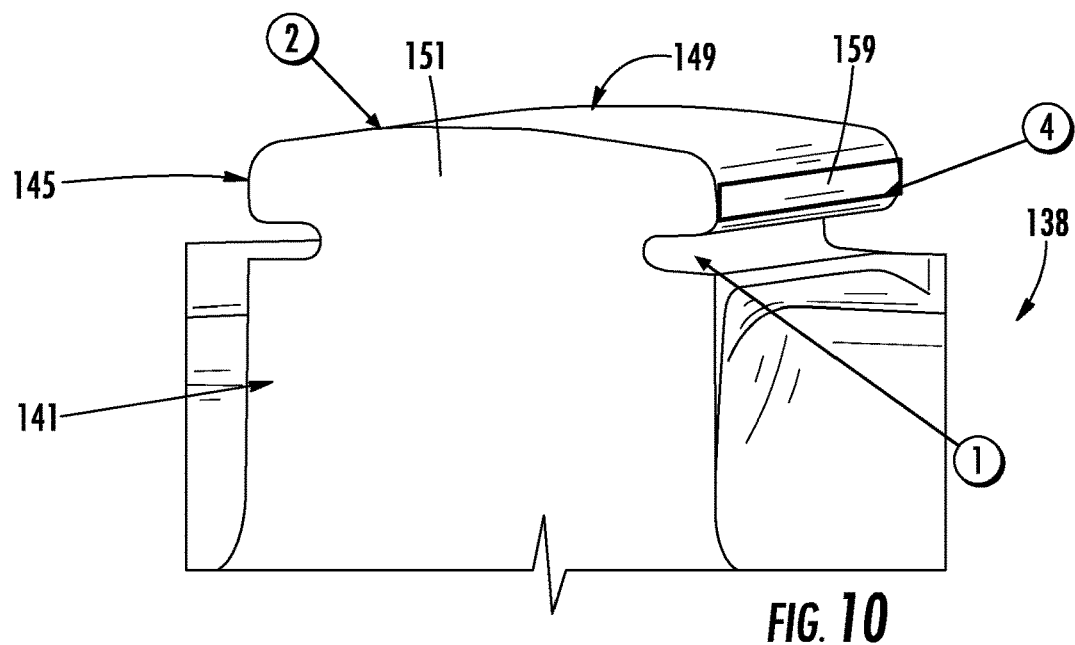
FIG. 10 illustrates a detailed, perspective view of the blade root portion of the low pressure turbine blade illustrated in FIG. 9.
Figure 11:
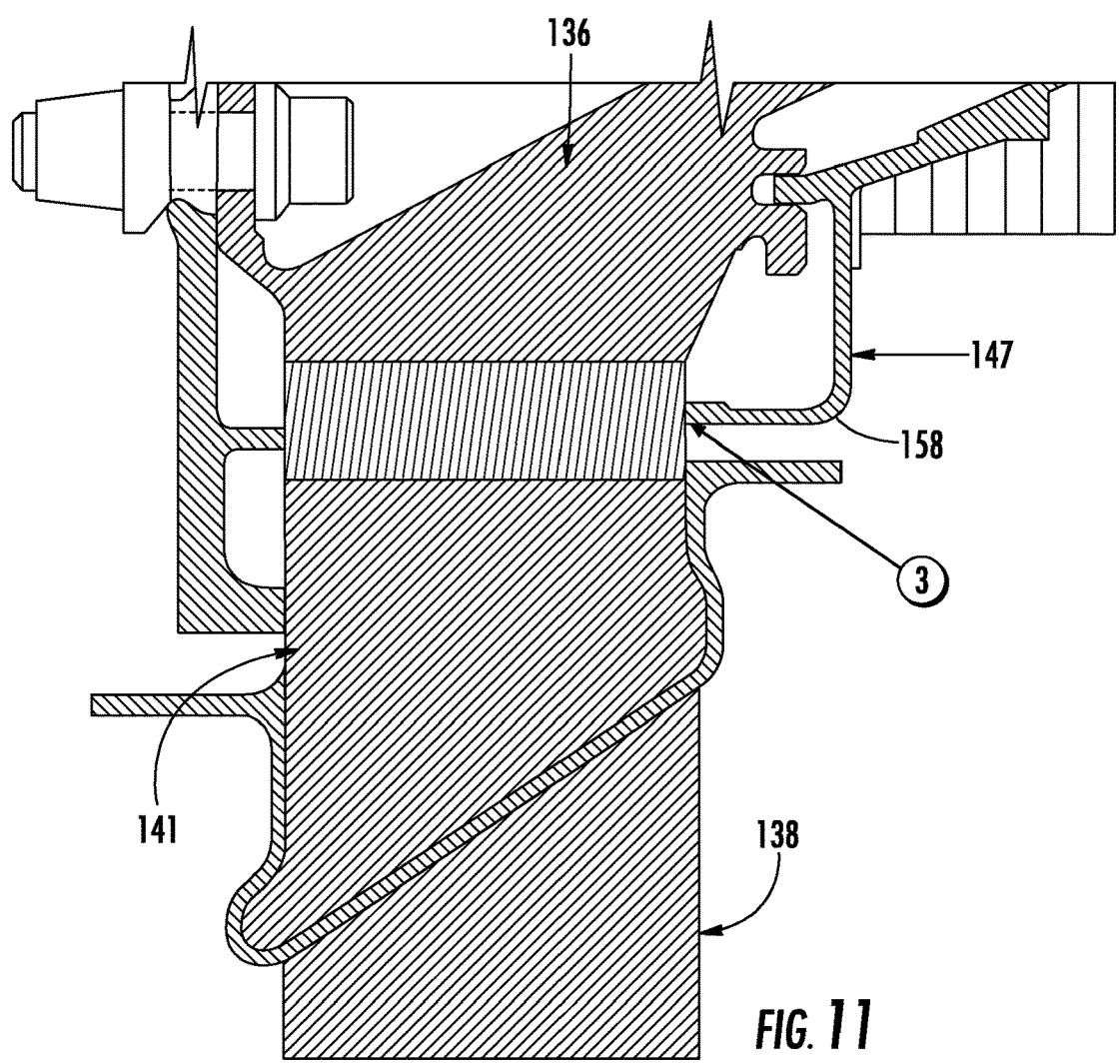
FIG. 11 illustrates a cross-sectional view of the low pressure turbine blade illustrated in FIG. 9 connected to the annular outer drum rotor.

Referring now to FIGS. 4-15, various views of multiple embodiments of the first plurality of low pressure turbine blades 138 according to the present disclosure are illustrated. More specifically, FIGS. 4-8 illustrate various views of one embodiment of the first plurality of low pressure turbine blades 138 according to the present disclosure. FIGS. 9-11 illustrate various views of another embodiment of the first plurality of low pressure turbine blades 138 according to the present disclosure. FIGS. 12-15 illustrate various views of yet another embodiment of the first plurality of low pressure turbine blades 138 according to the present disclosure.

Referring particularly to FIG. 4, a perspective view of one embodiment of one of the first plurality of low pressure turbine blades 138 according to the present disclosure is illustrated. As shown, the low pressure turbine blade 138 includes a blade root portion 141 for securing to the annular outer drum rotor 136. In addition, as shown, each of the blade root portions 141 may include one or more structural radial retention features 145 for radially retaining each of the blade root portions 141 within the annular outer drum rotor 136 and one or more axial retention features 147 (e.g. as shown in FIGS. 6, 11, 21, 22, and 26) for axially retaining each of the blade root portions 141 within the annular outer drum rotor 136. In certain embodiments, as will be discussed herein, the axial retention feature(s) 147 may include a rotating shroud 158 attached to the rotatable annular outer drum rotor 136, a piston or seal ring 163, side surfaces 159 of a dovetail 151 of a dovetail joint(s) 149, or similar.

More specifically, as shown, the structural radial retention feature(s) 145 may include a dovetail joint 149 and/or one or more radial retention hooks 153. In particular embodiments, the dovetail joint(s) 149 may have any suitable cross-sectional shape, such as for example, a fir-tree-shaped cross-section. In addition, as shown in the illustrated embodiment, the structural radial retention features 145 may include a combination of the dovetail joint 149 and the radial retention hook(s) 155, as well as one or more radial retention brackets 157. More specifically, as shown, each of the blade root portions 141 may include the dovetail joint(s) 149 arranged between one of the radial retention hook(s) 155 and one of the radial retention bracket(s) 155.

Thus, as shown particularly via numeral (1) in FIG. 5, the dovetail joint 149 is configured to provide radial retention of the individual low pressure turbine blades 138 (i.e. to prevent the blades 138 from falling out of the outer drum rotor 136 during assembly and/or engine shut down). In addition, as shown via numeral (4), the dovetail joint 149 is configured provide a path for torque transmission from the individual low pressure turbine blade 138 to the outer drum rotor 136 during operation of the gas turbine engine 10. Further, as shown via numeral (3), the low pressure turbine blade 138 may also be axially retained within the outer drum rotor 136 via the axial retention features 147, which in the illustrated embodiment includes a piston ring 163.

Figure 6:
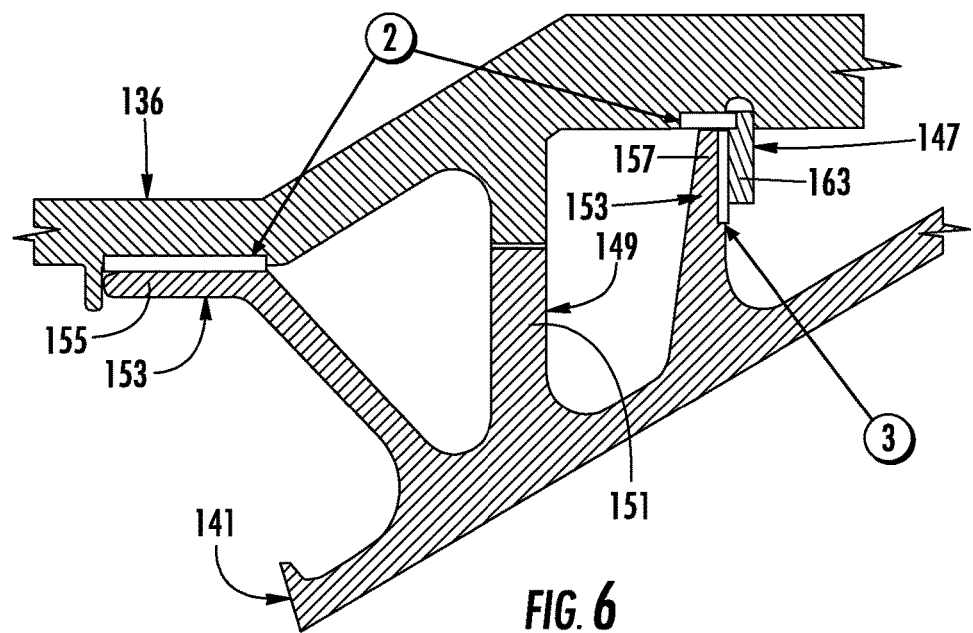
FIG. 6 illustrates a cross-sectional view of the low pressure turbine blade illustrated in FIG. 4 connected to the annular outer drum rotor.

Referring now to FIG. 6, a cross-sectional view of the low pressure turbine blade 138 of FIG. 4 being secured to the outer drum rotor 136 according to the present disclosure is illustrated. As shown at numeral (2), each of the blade root portions 141 of the first plurality of low pressure turbine blades 138 may include one or more operational radial retention features 153 for radially retaining each of the blade root portions 141 within the rotatable annular outer drum rotor 136 during operation of the gas turbine engine 10. In such embodiments, the operational radial retention feature(s) 153 may be activated to retain each of the blade root portions 141 within the rotatable annular outer drum rotor 136 only during operation of the gas turbine engine 10. For example, in particular embodiments, the operational radial retention feature(s) 153 may include an outer surface of the dovetail 151 of the dovetail joint 149, an outer surface of the radial retention hook(s) 155, and/or an outer surface of the radial retention bracket(s) 157. More specifically, as shown in FIG. 6, the operational radial retention features 153 may include the outer surfaces of the radial retention hook(s) 155 and/or the radial retention bracket(s) 157.

Referring particularly to FIG. 7, a schematic diagram of one embodiment of the assembly of the low pressure turbine blade 138 of FIG. 4 being secured to the outer drum rotor 136 is illustrated. Thus, as shown, after assembly, the dovetail joint 149 provides radial retention of the blade 138. In addition, as shown, gravity creates various gaps 160 between the radial retention hook(s) 155 and the outer drum rotor 136, between the radial retention bracket(s) 157 and the outer drum rotor 136, and between the dovetail joint 149 and the outer drum rotor 136. Accordingly, as shown in FIG. 8, during operation of the gas turbine engine 10, centrifugal forces act in the direction shown via arrow 161, with pressure loads acting on the blade 138 as shown via arrow 162. As such, the gaps 160 between the radial retention hook(s) 155 and the outer drum rotor 136, the radial retention bracket(s) 157 and the outer drum rotor 136, and the dovetail joint 149 and the outer drum rotor 136 are closed. Thus, as shown in FIG. 8, the radial retention hook(s) 155 and the radial retention bracket(s) 157 make contact with the outer drum rotor 136, thereby providing radial retention of the blade 138 during operation of the gas turbine engine 10.

Referring now to FIG. 9, a perspective view of another embodiment of one of the first plurality of low pressure turbine blades 138 according to the present disclosure is illustrated. As shown, the low pressure turbine blade 138 includes a blade root portion 141 for securing to the annular outer drum rotor 136. In addition, as shown, the blade root portion 141 may include one or more structural radial retention features 145 for radially retaining each of the blade root portions 141 within the annular outer drum rotor 136 and one or more axial retention features 147 for axially retaining each of the blade root portions 141 within the annular outer drum rotor 136.

More specifically, as shown, the structural radial retention feature(s) 145 may include a single dovetail joint 149. For example, as shown, in one embodiment, the dovetail joint(s) 149 may extend longitudinally in an axial direction 173 of the gas turbine engine 10 and may span a width of the blade root portion 141. Thus, as shown particularly via numeral (1) in FIG. 10, the dovetail joint 149 is configured to provide radial retention of the individual low pressure turbine blades 138 (i.e. to prevent the blades 138 from falling out of the outer drum rotor 136 during assembly and/or engine shut down). In addition, as shown via numeral (2), an outer surface of the dovetail 151 of the dovetail joint 149 is configured to provide radial retention of the individual low pressure turbine blade 138 within the outer drum rotor 136 during operation of the gas turbine engine 10.

For example, after assembly of the dovetail joint 149, gravity creates a gap (similar to the gap 160 in FIG. 7)

between the dovetail joint 149 and the outer drum rotor 136. Accordingly, during operation of the gas turbine engine 10, centrifugal forces act on the blade 138 such that the outer surface of the dovetail 151 is forced against the annular outer drum rotor 136. As such, the gap between the dovetail joint 149 and the outer drum rotor 136 is closed, thereby providing radial retention of the blade 138 during operation of the gas turbine engine 10.

In addition, as shown via numeral (3) in FIG. 11, the low pressure turbine blade 138 may also be axially retained within the outer drum rotor 136 via the axial retention feature 147, which in the illustrated embodiment includes the rotating shroud 158 of the rotatable annular outer drum rotor 136. In addition, as shown via numeral (4) of FIG. 10, side surfaces 159 of the dovetail joint 149 is configured provide a path for torque transmission from the individual low pressure turbine blade 138 to the outer drum rotor 136 during operation of the gas turbine engine 10.

Referring now to FIG. 12, a perspective view of yet another embodiment of one of the first plurality of low pressure turbine blades 138 according to the present disclosure is illustrated. As shown, the low pressure turbine blade 138 includes a blade root portion 141 for securing to the annular outer drum rotor 136. In addition, as shown, the blade root portion 141 may include one or more structural radial retention features 145 for radially retaining each of the blade root portions 141 within the annular outer drum rotor 136 and one or more axial retention features 147 for axially retaining each of the blade root portions 141 within the annular outer drum rotor 136.

Figure 15:
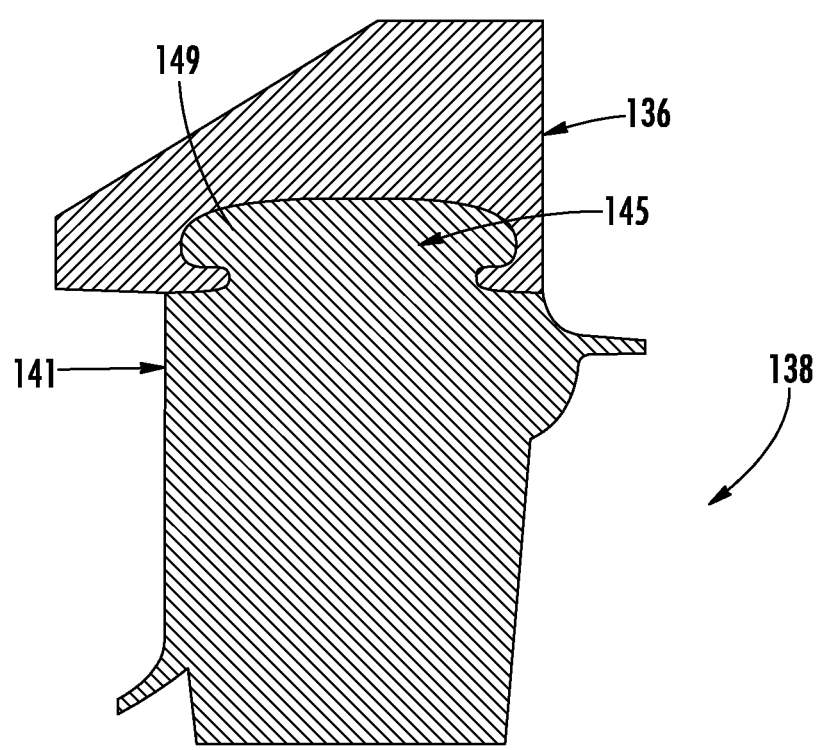
FIG. 15 illustrates a cross-sectional view of the low pressure turbine blade illustrated in FIG. 12 connected to the annular outer drum rotor.

More specifically, as shown in FIGS. 12 and 15, the structural radial retention feature(s) 145 may include a single dovetail joint 149. Alternatively to the embodiment of FIGS. 9-11, however, the dovetail joint(s) 149 may extend longitudinally in a radial direction 175 (i.e. a tangential direction) of the gas turbine engine 10 and may span a width of the blade root portion 141. Thus, as shown particularly via numeral (1) in FIG. 13 and FIG. 15, the dovetail joint 149 is configured to provide radial retention of the individual low pressure turbine blades 138 (i.e. to prevent the blades 138 from falling out of the outer drum rotor 136 during assembly and/or engine shut down). In addition, as shown via numeral (2), an outer surface of the dovetail 151 of the dovetail joint 149 is configured to provide radial retention of the individual low pressure turbine blade 138 within the outer drum rotor 136 during operation of the gas turbine engine 10.

For example, after assembly of the dovetail joint 149, gravity creates a gap (similar to the gap 160 in FIG. 7) between the dovetail joint 149 and the outer drum rotor 136. Accordingly, during operation of the gas turbine engine 10, centrifugal forces act on the blade 138 such that the outer surface of the dovetail 151 is forced against the annular outer drum rotor 136. As such, the gap between the dovetail joint 149 and the outer drum rotor 136 is closed, thereby providing radial retention of the blade 138 during operation of the gas turbine engine 10. In addition, as shown via numeral (3) in FIG. 14, the low pressure turbine blade 138 may also be axially retained within the outer drum rotor 136 via the axial retention feature 147, which in the illustrated embodiment includes side surfaces 159 of the dovetail 151 of the dovetail joint 149. In addition, as shown via numeral (4) of FIG. 13, the front face of the dovetail joint 149 is configured provide a path for torque transmission from the individual low pressure turbine blade 138 to the outer drum rotor 136 during operation of the gas turbine engine 10.

Figure 16:
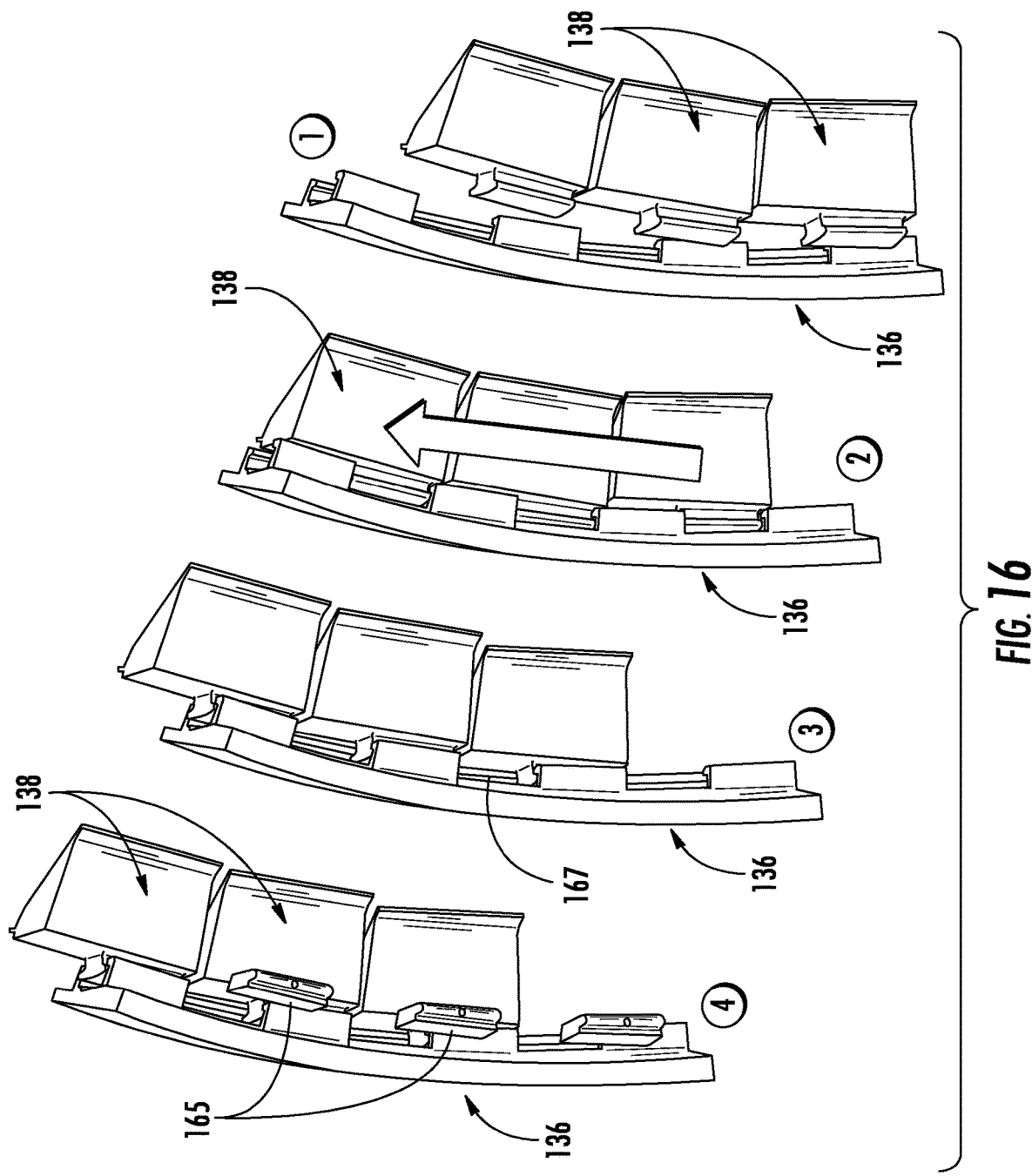
FIG. 16 illustrates a process flow diagram of one embodiment of a method for assembling a first plurality of low pressure turbine blades of a low pressure turbine of a gas turbine engine within a rotatable annular outer drum rotor according to the present disclosure.
Figure 17:
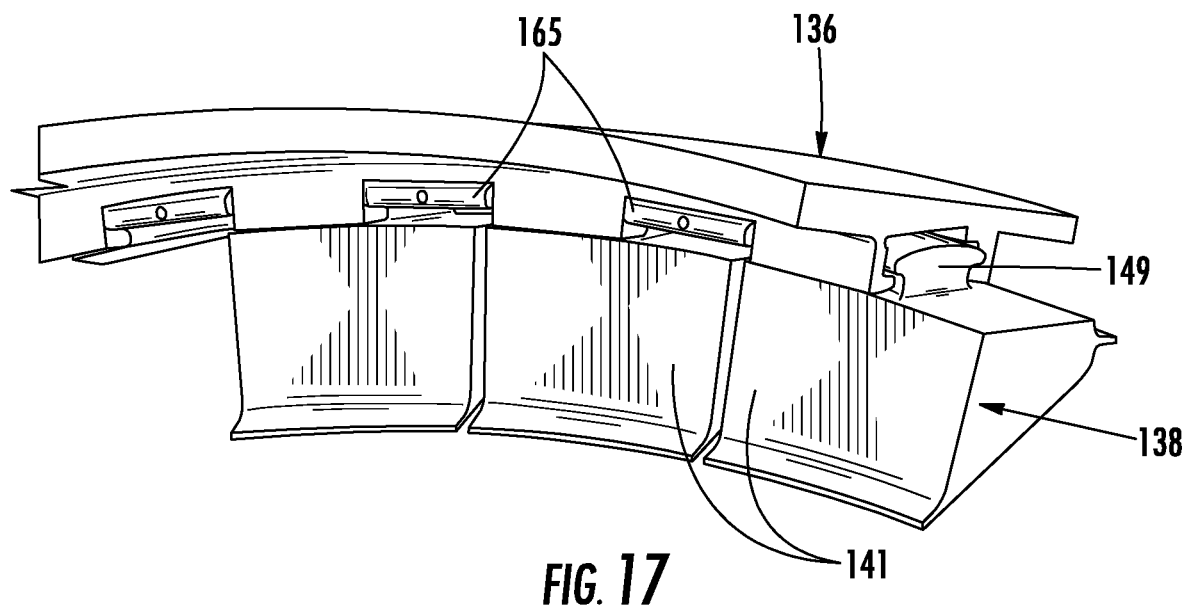
FIG. 17 illustrates an assembled first plurality of low pressure turbine blades within a rotatable annular outer drum rotor according to the present disclosure, particularly illustrating a plurality of spacers arranged between the turbine blades.
Figure 18:
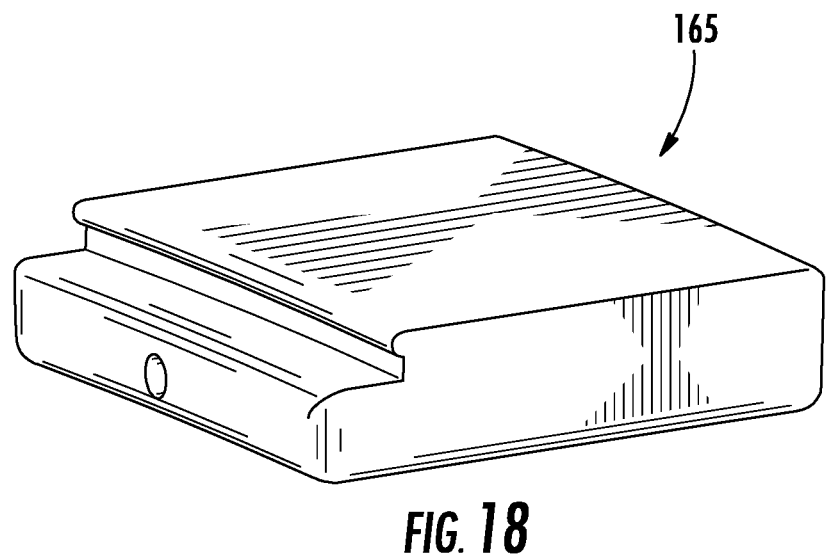
FIG. 18 illustrates a perspective view of one embodiment of a spacer for placing between low pressure turbine blades of a gas turbine engine according to the present disclosure.

Referring now to FIGS. 16-18, a process flow diagram of one embodiment of assembling the first plurality of low pressure turbine blades 138 within the rotatable annular outer drum rotor 136 illustrated in FIGS. 12-15 is illustrated in accordance with the present disclosure. More specifically, as shown at (1) and (2), the blade root portions 141 of the first plurality of low pressure turbine blades 138 are arranged within a first slot 164 of the rotatable annular outer drum rotor 136. Further, as shown at (2) and (3), the plurality of blade root portions 141 of the first plurality of low pressure turbine blades 138 are rotated within the first slot 164 of the rotatable annular outer drum rotor 136. Moreover, as shown at (3) and (4), the process includes inserting a plurality of spacers 165 into a plurality of second slots 167 of the rotatable annular outer drum rotor 136 between one or more of the plurality of blade root portions 141 of the first plurality of low pressure turbine blades 138 so as to secure the first plurality of low pressure turbine blades 138 within the rotatable annular outer drum rotor 136 and/or to minimize the gaps between the first plurality of low pressure turbine blades 138. An assembled rotatable annular outer drum rotor 136 with the first plurality of low pressure turbine blades 138 and the plurality of spacers 165 secured therein is illustrated in FIG. 17. Details of the spacer(s) 165 are further illustrated in FIG. 18.

Figure 19:
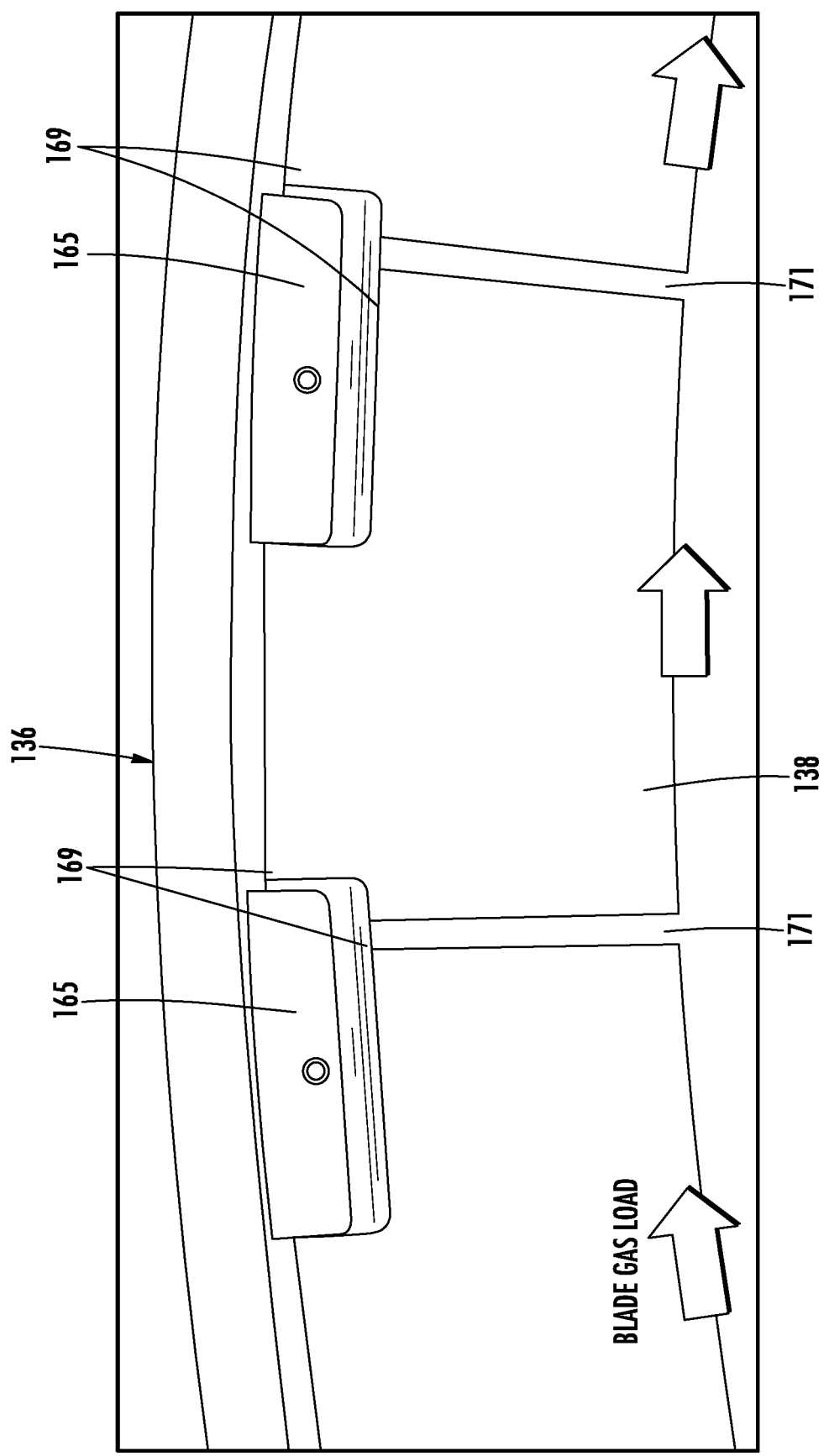
FIG. 19 illustrates a cross-sectional view of one embodiment of an assembled first plurality of low pressure turbine blades within a rotatable annular outer drum rotor according to the present disclosure, particularly illustrating a plurality of spacers arranged between the turbine blades.

Thus, as shown in FIG. 19, a cross-section of the assembled rotatable annular outer drum rotor 136 with the first plurality of low pressure turbine blades 138 and the plurality of spacers 165 secured therein is illustrated. The low pressure turbine blades 138 are generally subjected to high temperature, therefore, the blade design must take into account the blade root portion design and the spacer thermal expansion. Accordingly, as shown, the spacers 165 may be designed such that two sides are in contact with the annular outer drum rotor 136 and two sides have a gap 169 between the annular outer drum rotor 136. This design ensures a design criterion of maintaining tangential gaps 171 between the blades 138.

Figure 20:
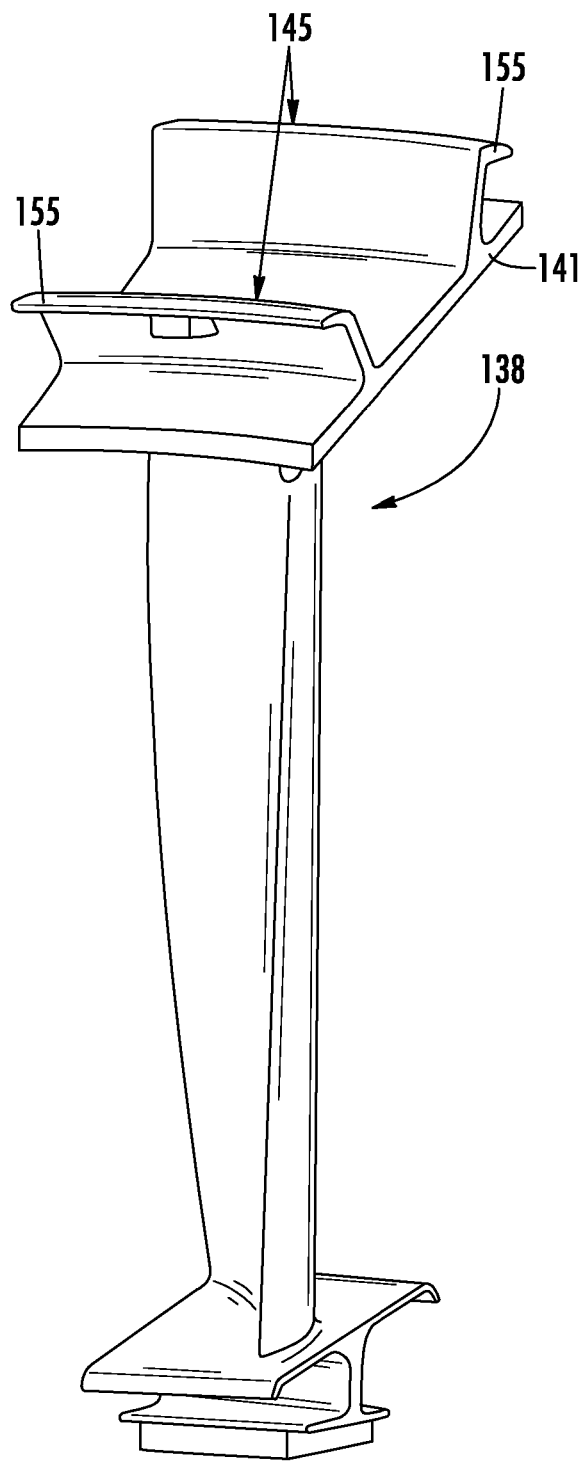
FIG. 20 illustrates a perspective view of a further embodiment of one of the first plurality of low pressure turbine blades according to the present disclosure.
Figure 21:
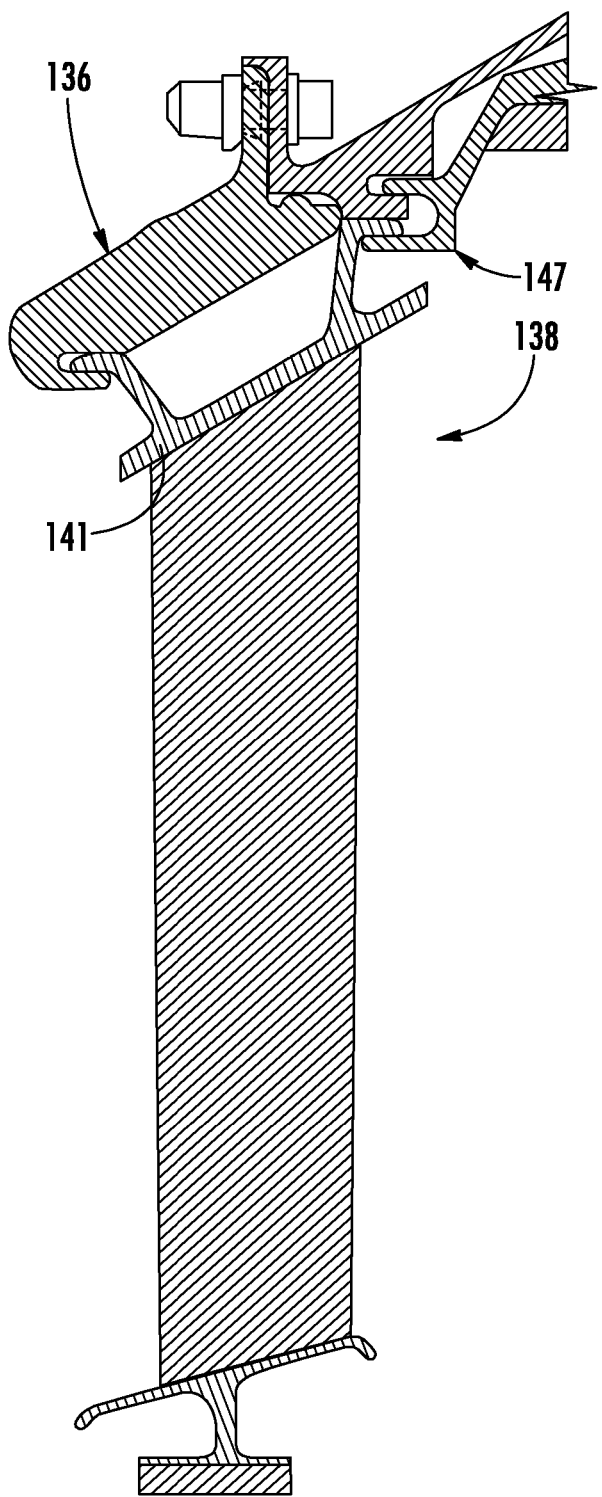
FIG. 21 illustrates a cross-sectional view of the low pressure turbine blade illustrated in FIG. 20 connected to the annular outer drum rotor.

Referring now to FIG. 20, a perspective view of still another embodiment of one of the first plurality of low pressure turbine blades 138 according to the present disclosure is illustrated. As shown, the low pressure turbine blade 138 includes a blade root portion 141 for securing to the annular outer drum rotor 136 (FIG. 21). In addition, as shown in FIGS. 20 and 21, the blade root portion 141 may include one or more structural radial retention features 145 for radially retaining each of the blade root portions 141 within the annular outer drum rotor 136 and one or more axial retention features 147 for axially retaining each of the blade root portions 141 within the annular outer drum rotor 136.

Figure 22:
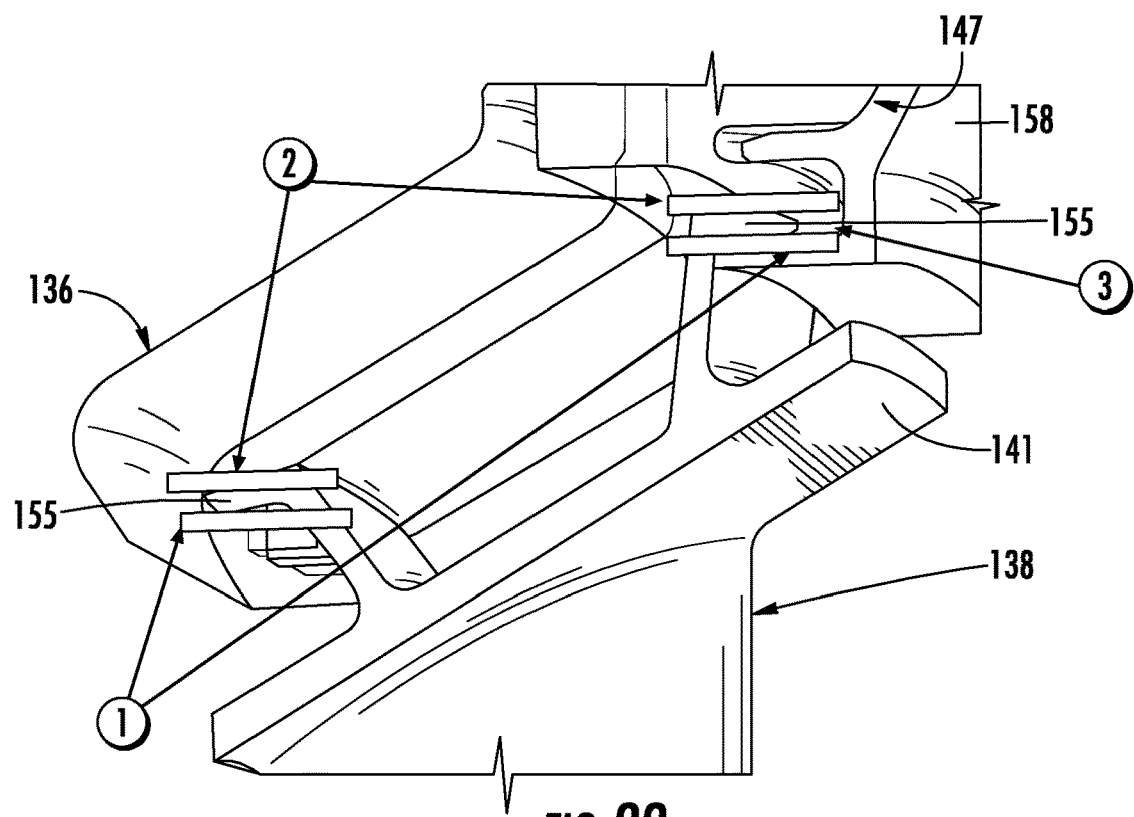
FIG. 22 illustrates a detailed, perspective view of the blade root portion of the low pressure turbine blade illustrated in FIG. 20 connected to the annular outer drum rotor.

More specifically, as shown, the structural radial retention feature(s) 145 may include a plurality of the radial retention hooks 155 (e.g. mirrored hooks on opposing sides of the blade root portion 141). Thus, as shown in FIG. 22 via numeral (1), the radial retention hooks 155 are configured to provide radial retention of the individual low pressure turbine blades 138 (i.e. to prevent the blades 138 from falling out of the outer drum rotor 136). In addition, as shown via numeral (2) in FIG. 22, outer surfaces of the radial retention hooks 155 are configured to provide radial retention of the individual low pressure turbine blade 138 within the outer drum rotor 136 during operation of the gas turbine engine 10.

Figure 23:
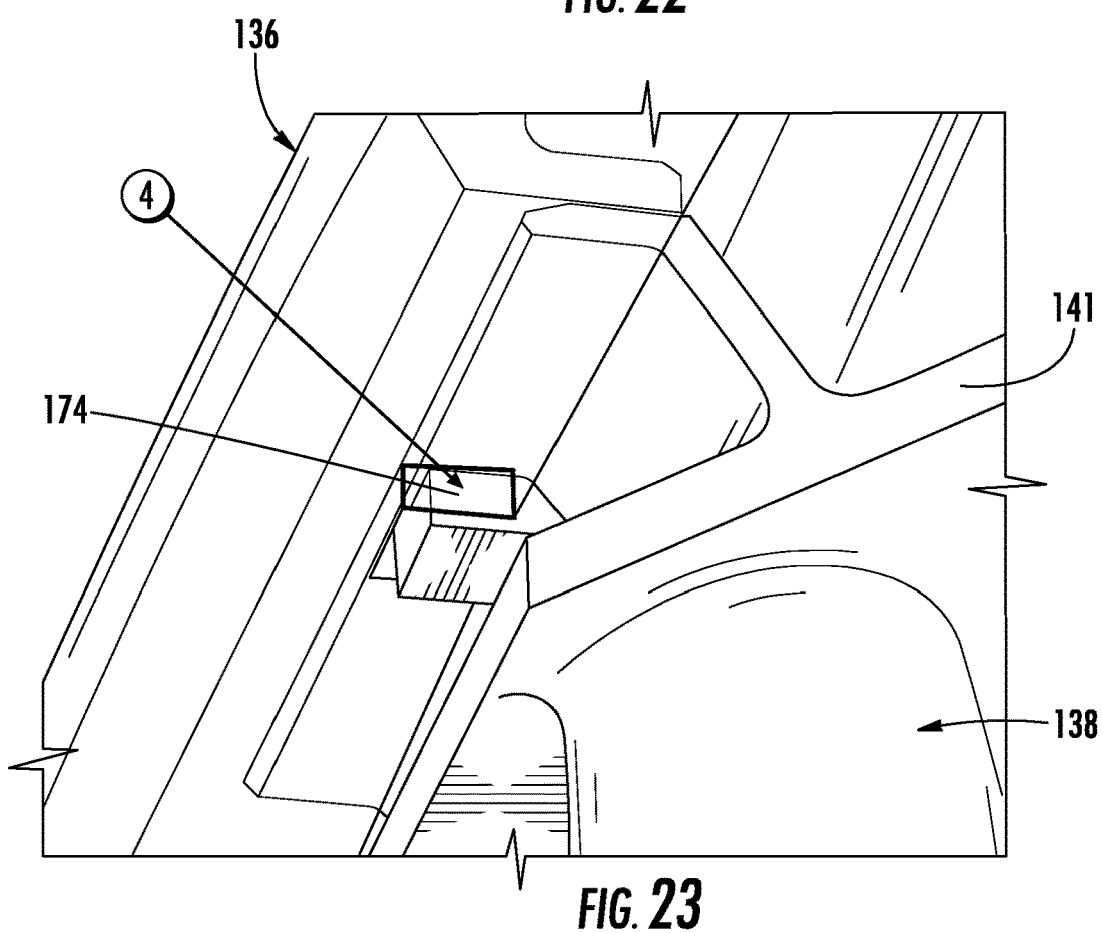
FIG. 23 illustrates another detailed, perspective view of the blade root portion of the low pressure turbine blade illustrated in FIG. 20 connected to the annular outer drum rotor.

For example, as shown in FIG. 22, gravity creates a gap (similar to the gap 160 in FIG. 7) between the radial retention hooks 155 and the outer drum rotor 136. Accordingly, during operation of the gas turbine engine 10, centrifugal forces act on the blade 138 such that the outer surfaces of the radial retention hooks 155 are forced against the annular outer drum rotor 136. As such, the gap between the radial retention hooks 155 and the outer drum rotor 136 is closed, thereby providing radial retention of the blade 138 during operation of the gas turbine engine 10. In addition, as shown via numeral (3) in FIG. 22, the low pressure turbine blade 138 may also be axially retained within the outer drum rotor 136 via the axial retention feature 147, which in the illustrated embodiment represents the rotating shroud 158 of the rotatable annular outer drum rotor 136 or a piston ring 163. In addition, as shown via numeral (4) of FIG. 23, the radial retention hooks 155 may further include one or more ribs or protrusions 174 for providing a path for torque transmission from the individual low pressure turbine blade 138 to the outer drum rotor 136 during operation of the gas turbine engine 10.

Referring now to FIG. 24, a perspective view of yet another embodiment of one of the first plurality of low pressure turbine blades 138 according to the present disclosure is illustrated. As shown, the low pressure turbine blade 138 includes a blade root portion 141 for securing to the annular outer drum rotor 136 (FIG. 25). In addition, as shown in FIGS. 24 and 25, the blade root portion 141 may include one or more structural radial retention features 145 for radially retaining each of the blade root portions 141 within the annular outer drum rotor 136 and one or more axial retention features 147 for axially retaining each of the blade root portions 141 within the annular outer drum rotor 136.

Figure 26:
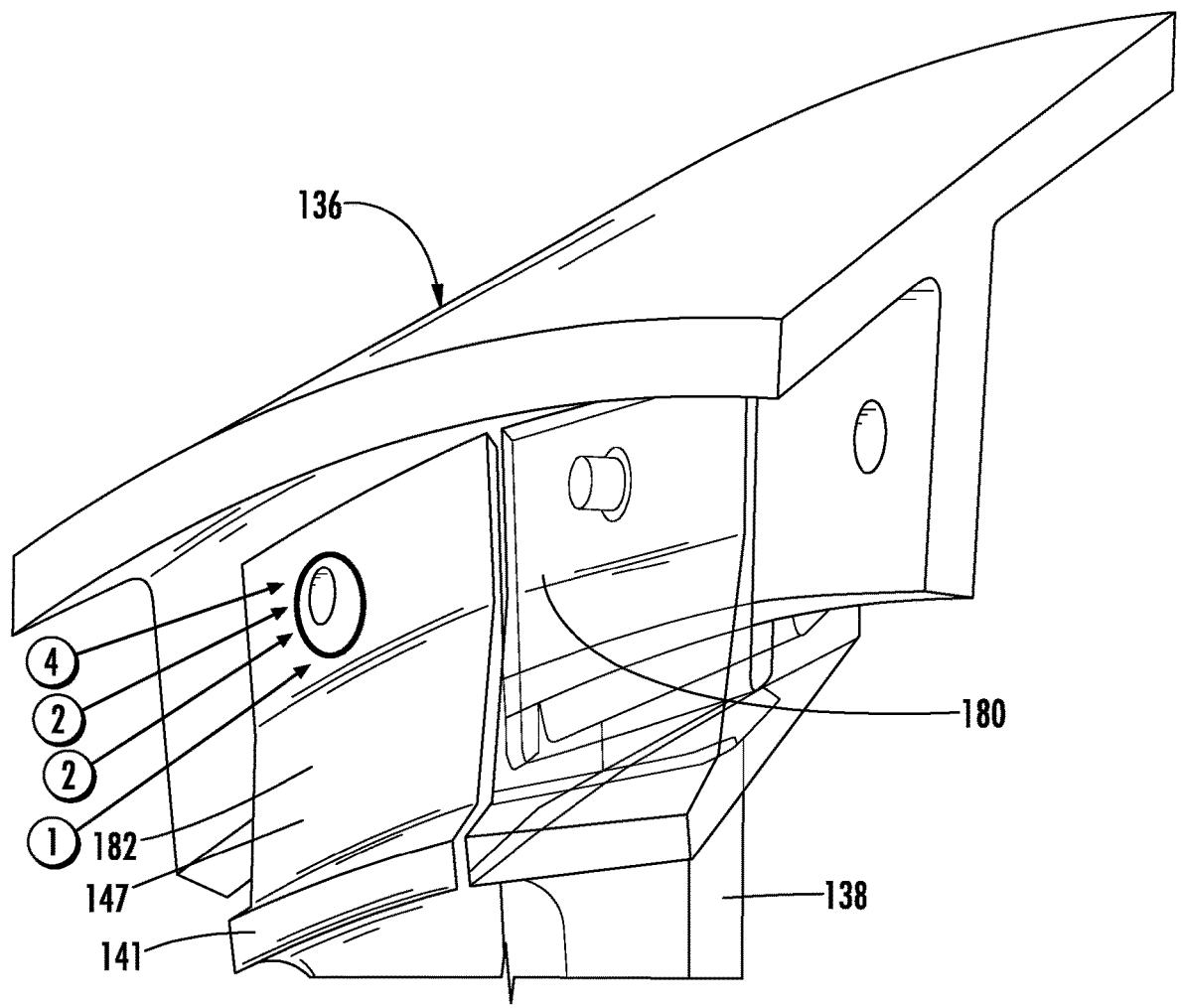
FIG. 26 illustrates a detailed, perspective view of the blade root portion of the low pressure turbine blade illustrated in FIG. 24 connected to the annular outer drum rotor.

More specifically, as shown, the structural radial retention feature(s) 145 may include corresponding male and female interlocking elements 180, 182 and one or more fasteners 184 arranged through the corresponding male and female interlocking elements 180, 182. For example, in the illustrated embodiment, the blade root portions 141 may include the female interlocking element 182, whereas the rotatable annular outer drum 136 rotor may include the male interlocking element 180. Thus, as shown in FIG. 26 via numeral (1), the corresponding male and female interlocking elements 180, 182 and the fastener(s) 184 are configured to provide radial retention of the individual low pressure turbine blades 138 (i.e. to prevent the blades 138 from falling out of the outer drum rotor 136). In addition, as shown via numeral (2), the corresponding male and female interlocking elements 180, 182 and the fastener(s) 184 are configured to provide radial retention of the individual low pressure turbine blade 138 within the outer drum rotor 136 during operation of the gas turbine engine 10.

In addition, as shown via numeral (3) in FIG. 26, the low pressure turbine blade 138 may also be axially retained within the outer drum rotor 136 via the axial retention feature 147, which in the illustrated embodiment is represented by the corresponding male and female interlocking elements 180, 182 and the fastener(s) 184. In addition, as shown via numeral (4) of FIG. 26, the corresponding male and female interlocking elements 180, 182 and the fastener (s) 184 may further provide a path for torque transmission from the individual low pressure turbine blade 138 to the outer drum rotor 136 during operation of the gas turbine engine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbomachine, comprising:
a rotatable annular outer drum rotor connected to a first plurality of blades;
each of the first plurality of blades comprising a blade root portion secured to the rotatable annular outer drum rotor, each of the blade root portions comprising one or more structural radial retention features for radially retaining each of the blade root portions within the rotatable annular outer drum rotor and one or more axial retention features for axially retaining each of the blade root portions within the rotatable annular outer drum rotor.

2. The turbomachine of claim 1, wherein the turbomachine comprises at least one of a turbine section, a compressor section, or a generator.

3. The turbomachine of claim 2, wherein the turbomachine comprises the turbine section, the turbine section comprising a high pressure rotor comprising a high pressure turbine and a low pressure turbine comprising counter rotatable low pressure inner and outer rotors located aft of the high pressure rotor, the low pressure turbine further comprising the rotatable annular outer drum rotor connected to the first plurality of blades and a rotatable annular inner drum rotor connected to a second plurality of blades.

4. The turbomachine of claim 1, wherein the one or more structural radial retention features comprises at least one of a dovetail joint or one or more radial retention hooks.

5. The turbomachine of claim 4, wherein the one or more structural radial retention features comprises the dovetail joint, the one or more radial retention hooks, and one or more radial retention brackets.

6. The turbomachine of claim 4, wherein the one or more axial retention features comprise at least one of a rotating shroud of the rotatable annular outer drum rotor, a piston ring, a seal ring, or side surfaces of a dovetail of the dovetail joint.

7. The turbomachine of claim 4, wherein the dovetail joint extends longitudinally in an axial direction of the turbomachine and spans a width of the blade root portion.

8. The turbomachine of claim 4, wherein the dovetail joint extends longitudinally in a radial direction of the turbomachine and spans a width of the blade root portion.

9. The turbomachine of claim 4, wherein the dovetail joint provides a path for torque transmission from each of the first plurality of blades to the rotatable annular outer drum rotor.

10. The turbomachine of claim 4, wherein the dovetail joint comprises a fir-tree-shaped cross-section.

11. The turbomachine of claim 1, wherein each of the blade root portions of the first plurality of blades further comprises one or more operational radial retention features for radially retaining each of the blade root portions within the rotatable annular outer drum rotor during operation of the turbomachine, the one or more operational radial retention features being activated to retain each of the blade root portions within the rotatable annular outer drum rotor only during operation of the turbomachine.

12. The turbomachine of claim 11, wherein the one or more operational radial retention features are activated via one or more centrifugal forces that occur during operation of the turbomachine so as to further radially retain each of the blade root portions within the rotatable annular outer drum rotor.

13. The turbomachine of claim 12, wherein the one or more operational radial retention features comprises an outer surface of at least one of a dovetail of at least one dovetail joint, the one or more radial retention hooks, or one or more radial retention brackets.

14. The turbomachine of claim 13, wherein each of the blade root portions comprise the at least one dovetail joint arranged between one of the one or more radial retention hooks and one of the one or more radial retention brackets.

15. A method of assembling a plurality of blades within a rotatable annular outer drum rotor of a turbomachine, the method comprising:
arranging a plurality of blade root portions of the plurality of blades within a slot of the rotatable annular outer drum rotor;
rotating the plurality of blade root portions of the plurality of blades within the slot of the rotatable annular outer drum rotor; and
inserting a plurality of spacers into the slot of the rotatable annular outer drum rotor between one or more of the plurality of blade root portions of the plurality of blades so as to secure the plurality of blades within the rotatable annular outer drum rotor and to minimize gaps between the plurality of blades.

16. The method of claim 15, wherein each of the blade root portions comprises one or more structural radial retention features for radially retaining each of the blade root portions within the rotatable annular outer drum rotor and one or more axial retention features for axially retaining each of the blade root portions within the rotatable annular outer drum rotor.

17. The method of claim 16, wherein the one or more structural radial retention features comprises at least one of a dovetail joint or one or more radial retention hooks.

18. The method of claim 17, wherein the one or more structural radial retention features comprises the dovetail joint, the one or more radial retention hooks, and one or more radial retention brackets.

19. The method of claim 17, wherein the one or more axial retention features comprise at least one of a rotating shroud of the rotatable annular outer drum rotor, a piston ring, a seal ring, or side surfaces of a dovetail of the dovetail joint.

20. A turbomachine, comprising:
a rotatable annular outer drum rotor connected to a plurality of blades; and
each of the plurality of blades comprising a blade root portion secured to the rotatable annular outer drum rotor, the blade root portions being secured to the rotatable annular outer drum rotor via a plurality of corresponding male and female interlocking elements and one or more fasteners arranged through the corresponding male and female interlocking elements.

* * * * *